(12) United States Patent
Kato

(10) Patent No.: US 7,929,167 B2
(45) Date of Patent: Apr. 19, 2011

(54) APPARATUS AND PRINT PROCESSING METHOD

(75) Inventor: Hisashi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1038 days.

(21) Appl. No.: 11/676,204

(22) Filed: Feb. 16, 2007

(65) Prior Publication Data

US 2007/0201926 A1    Aug. 30, 2007

(30) Foreign Application Priority Data

Feb. 24, 2006   (JP) ................................. 2006-049107

(51) Int. Cl.
  *G06F 3/12*   (2006.01)
  *G06K 15/00*  (2006.01)
(52) U.S. Cl. ........................ 358/1.15; 358/1.1; 358/1.18
(58) Field of Classification Search .................. 358/1.1, 358/1.11–1.18, 498
See application file for complete search history.

(56) References Cited

U.S. PATENT DOCUMENTS

| 7,167,919 | B2 |   | 1/2007 | Iwamoto et al. | |
| 7,701,599 | B2 | * | 4/2010 | Kumashio | 358/1.15 |
| 2002/0097431 | A1 | * | 7/2002 | Ikegami | 358/1.15 |
| 2003/0086111 | A1 | * | 5/2003 | Akiyoshi | 358/1.14 |
| 2004/0046972 | A1 | * | 3/2004 | Shibao | 358/1.1 |
| 2005/0105146 | A1 | * | 5/2005 | Tanaka | 358/498 |
| 2006/0177255 | A1 | * | 8/2006 | Mizoi | 400/62 |
| 2007/0041039 | A1 | * | 2/2007 | Doui | 358/1.15 |

FOREIGN PATENT DOCUMENTS

| JP | 11-312067 A | 11/1999 |
| JP | 2004-185629 A | 7/2004 |

* cited by examiner

*Primary Examiner* — James A Thompson
*Assistant Examiner* — Satwant K Singh
(74) *Attorney, Agent, or Firm* — Canon U.S.A., Inc. I.P. Division

(57) ABSTRACT

An apparatus is configured to allow a user to make a selection as to whether printing of print data is performed according to print setting is specified to be unchangeable, or according to restriction information indicating restriction in printing instructed by the user.

9 Claims, 25 Drawing Sheets

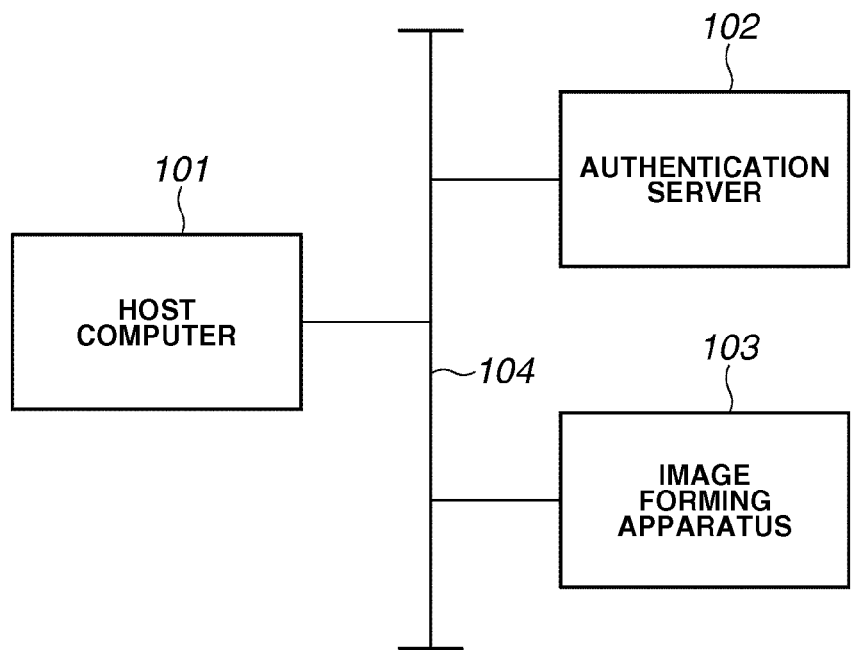

| BOX MANAGEMENT INFORMATION ||
|---|---|
| BOX NUMBER | USER NAME |
| 0 | User1 |
| 1 | User2 |
| 2 | User3 |
| 3 |  |
| 4 |  |

FIG.14

PRINT SETTING SCREEN

OUTPUT PAPER: A4 ▼

DUPLEX PRINTING: OFF ▼

COLOR SETTING
- ◉ COLOR
- ○ MONOCHROMATIC

BOX SETTING
- ☑ Box1
- ☑ Box2
- ☑ Box3

[ OK ]  [ CANCEL ]

FIG.17

| Bit \ Byte | 7 | 6 | 5 | 4 | 3 | 2 | 1 | 0 |
|---|---|---|---|---|---|---|---|---|
| 0 | \multicolumn{8}{c|}{OPERATION CODE} | | | | | | | |
| 1 | | | | | | | | |
| 2 | BLOCK NUMBER | | | | | | | |
| 3 | | | | | | | | |
| 4 | PARAMETER LENGTH | | | | | | | |
| 5 | | | | | | | | |
| 6 | ERROR FLAG | NOTIFICATION FLAG | | | | | | |
| 7 | | | | | | REQUEST RESPONSE | CONTINUATION FLAG | SEND RESPONSE |
| 8 | USER ID | | | | | | | |
| 9 | | | | | | | | |
| 10 | PASSWORD | | | | | | | |
| 11 | | | | | | | | |
| 12~ | DATA | | | | | | | |

FIG.20

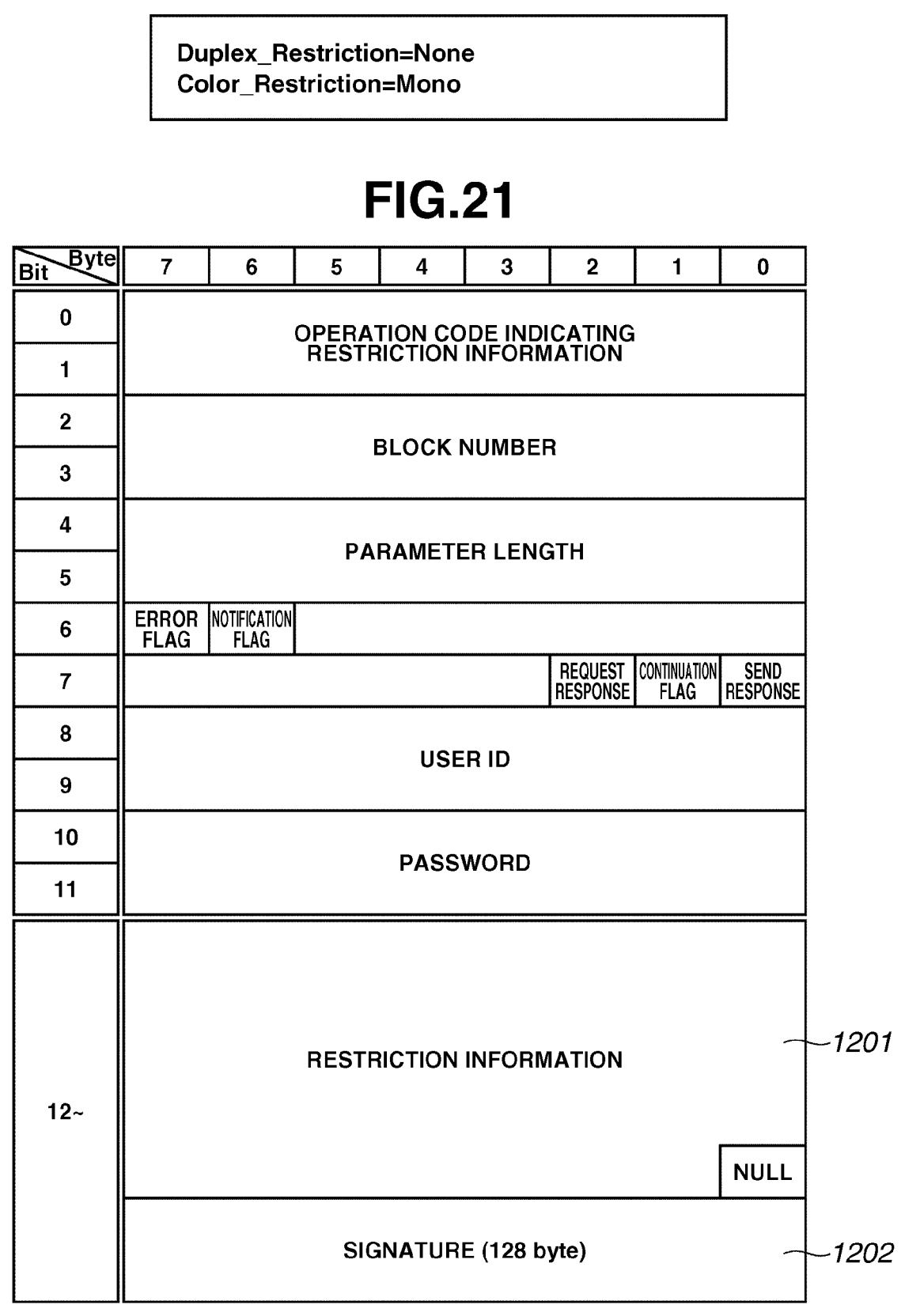

Duplex_Restriction=None
Color_Restriction=Mono

FIG.21

| Bit / Byte | 7 | 6 | 5 | 4 | 3 | 2 | 1 | 0 |
|---|---|---|---|---|---|---|---|---|
| 0 | \multicolumn{8}{c}{OPERATION CODE INDICATING RESTRICTION INFORMATION} | | | | | | | |
| 1 | | | | | | | | |
| 2 | \multicolumn{8}{c}{BLOCK NUMBER} | | | | | | | |
| 3 | | | | | | | | |
| 4 | \multicolumn{8}{c}{PARAMETER LENGTH} | | | | | | | |
| 5 | | | | | | | | |
| 6 | ERROR FLAG | NOTIFICATION FLAG | | | | | | |
| 7 | | | | | | REQUEST RESPONSE | CONTINUATION FLAG | SEND RESPONSE |
| 8 | \multicolumn{8}{c}{USER ID} | | | | | | | |
| 9 | | | | | | | | |
| 10 | \multicolumn{8}{c}{PASSWORD} | | | | | | | |
| 11 | | | | | | | | |
| 12~ | RESTRICTION INFORMATION ~1201 |
| | NULL |
| | SIGNATURE (128 byte) ~1202 |

FIG.28

DOCUMENT NAME: DOCUMENT 2

OUTPUT PAPER = A4

COLOR SETTING = COLOR

DUPLEX PRINTING = OFF

SETTING FOR RETAINING FORMAT = ON

APPARATUS AND PRINT PROCESSING METHOD

BACKGROUND OF THE INVENTION

1. Field of the Invention

The present invention relates to an apparatus and a print processing method.

2. Description of the Related Art

In these days, in a printing system, much attention is given to reduction not only in initial costs of introduction of an image processing apparatus and a printing system but also in total cost of ownership (TCO) including costs of consumables such as print paper and colorant (e.g., toner) from a standpoint of business expenses and global environmental protection.

Conventionally, a problem is that, when an image processing apparatus is placed in an office and access to a network is available via the image processing apparatus, every person who desires to print, can use the image processing apparatus. In such an office environment, because no restriction on use of the image processing apparatus is applied to a person, printing is often performed without making a setting that contributes to reduction in the TCO such as a setting for monochromatic printing and duplex printing. Accordingly, business costs can be increased.

In this regard, Japanese Patent Application Laid-Open No. 2004-185629 discusses an image processing apparatus that restricts use of a function by a user based on restriction information corresponding to each user. The image processing apparatus of this kind determines whether a print job output from a host computer can be performed based on user restriction information.

In addition, Japanese Patent Application Laid-Open No. 11-312067 discusses an image processing apparatus in which a print setting of a print job cannot be specified and changed by a user. In this type of image processing apparatus, when a change in a print setting is not permitted to a user of a host computer, a print job is performed without changing a setting of a print job. On the other hand, when a change of a print setting is permitted to a user of a host computer, the user of the image processing apparatus can change the print setting of the print job on the image processing apparatus. In this case, the image processing apparatus performs the print job according to the changed print setting.

A processing apparatus can restrict use of a function by a user and utilize a box printing function. According to a box printing function, print data from a host computer is stored in a hard disk in an image processing apparatus and the stored print data is output afterwards according to an instruction given from an operation screen of an image processing apparatus. In the case of the box printing, a print setting of print data and restriction information of a user instructing a box printing can contradict each other.

For example, when a user who sends print data from a host computer to an image processing apparatus, is permitted to perform color printing, print data stored in a hard disk using a box printing function is provided with a print setting indicating that a color printing can be permitted. When the print data is a business form to be printed in a color printing, the print data is provided with a print setting indicating that the print data is printed in a color printing. However, when a user is permitted to perform only monochromatic printing, namely, a user is prevented from color printing, if the user attempts to print the print data using a box printing function, monochromatic print is output. Accordingly, the print setting is inappropriately changed in this case. On the other hand, when change in the print setting is not permitted to the print data, the user who is prevented from color printing cannot instruct printing of the print data.

That is, in a conventional technique, a selection between printing according to restriction information of a user who instructs a box printing, and printing according to a setting of print data whose print setting is unchangeable, cannot be made arbitrarily in accordance with a restriction policy.

SUMMARY OF THE INVENTION

The present invention allows a user to select whether printing is performed according to a setting of print data that is unchangeable or according to restriction information of a user who instructs the printing of the print data.

According to an aspect of the present invention, an apparatus includes a print data storage unit configured to store print data whose print setting is specified to be unchangeable; a print unit configured to print the print data stored in the print data storage unit; and a selection unit configured to allow a user to select whether printing of the print data is performed according to the print setting made for the print data or according to restriction information indicating restriction in printing instructed by the user.

According to other aspects of the present invention, a print processing method, a program for controlling print processing, and a storage medium storing the program are provided.

Further features and aspects of the present invention will become apparent from the following detailed description of exemplary embodiments with reference to the attached drawings.

BRIEF DESCRIPTION OF THE DRAWINGS

The accompanying drawings, which are incorporates in and constitute a part of the specification, illustrate exemplary embodiments, features, and aspects of the invention and, together with the description, serve to explain the principle of the invention.

FIG. 1 illustrates a functional configuration of a print system according to an exemplary embodiment of the present invention.

FIG. 2 illustrates a database that stores authentication information and restriction information about each user that an authentication server maintains according to an exemplary embodiment of the present invention.

FIG. 14 illustrates a print setting screen according to an exemplary embodiment of the present invention.

FIG. 17 illustrates a configuration of a job packet according to an exemplary embodiment of the present invention.

FIG. 20 illustrates a description format of restriction information according to an exemplary embodiment of the present invention.

FIG. 21 illustrates a job packet for restriction information according to an exemplary embodiment of the present invention.

FIG. 28 illustrates attribute information indicating an attribute of a document according to an exemplary embodiment of the present invention.

DETAILED DESCRIPTION OF THE EXEMPLARY EMBODIMENTS

Figure 3:
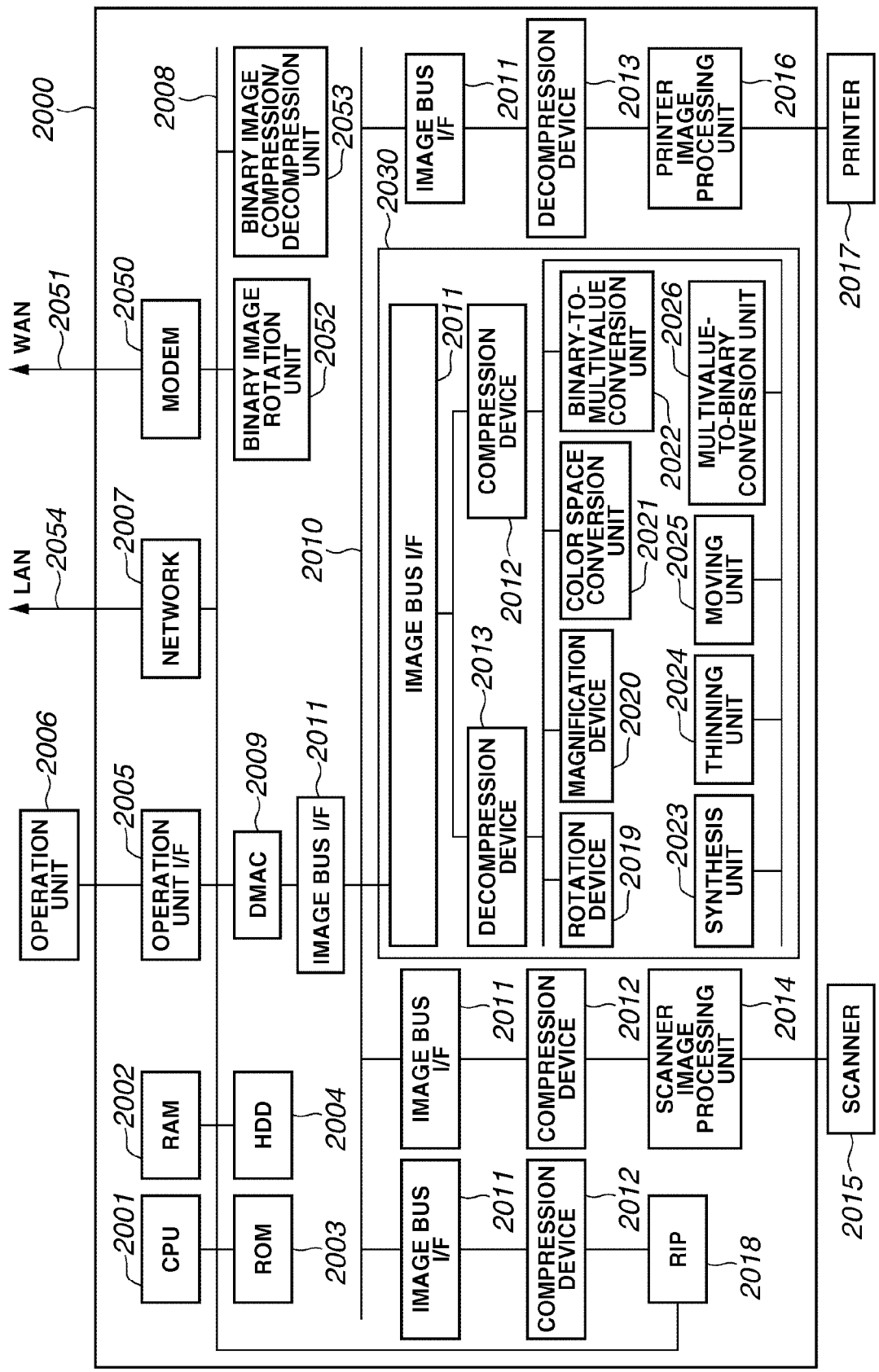
FIG. 3 illustrates a functional configuration of an image forming apparatus according to an exemplary embodiment of the present invention.

Various exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Exemplary Embodiment

FIG. 1 illustrates a functional configuration of a print system. Referring to FIG. 1, a host computer 101 is used by a user, produces print data and sends the produced print data to an image forming apparatus. An authentication server 102 includes user authentication information and user output restriction information. An image forming apparatus 103 receives print data via a network and performs printing on an actual paper utilizing an existing print technique such as an electrophotographic technique and an ink jet printing technique. The host computer 101, the authentication server 102, and the image forming apparatus 103 are mutually connected via a network 104, for example, using an existing technique such as Ethernet.

FIG. 2 illustrates a database that stores authentication information and restriction information about each user that the authentication server 102 maintains. The database is stored in a hard disk of the authentication server 102.

Referring to FIG. 2, each row indicates an entry by a user, and each column includes authentication information and restriction information of each user. The database includes a user name 201, a password 202, a restriction on color printing 203, a restriction on duplex printing 204, and a setting for retaining a format 205, which indicates whether a format can be retained. Here, when "color" is indicated in the color restriction information 203, a corresponding user can perform color printing. When "mono" is indicated in the color restriction information 203, a corresponding user can perform only monochromatic printing and cannot perform color printing. When "none" is indicated in the duplex printing restriction information 204, a corresponding user can perform either single-sided or two-sided printing. On the other hand, when "duplex" is indicated for the duplex printing restriction information 204, a corresponding user can perform only two-sided printing. When "yes" is indicated in the format retaining restriction information 205, a user has an authority to specify an attribute such that a content of print setting on the host computer 101 cannot be changed in the image forming apparatus 103.

Note that a password 202 is indicated in plain text for convenience sake. However, in an actual operation, in order to prevent a leakage of a password, only a one-way hash value in plain text is stored for security purposes, and the authentication server 102 performs an authentication by a comparison between a hash value of an entered password and the one-way hash value in plain text. For security purposes, the database can be read and written only by a user having an administrator authority.

A row 211 indicates an entry of a user having a name "user 1". A password of the user 1 is a text string "Akd5sj4f". For the user 1, "color" is specified in the color restriction information 203 and "none" is specified in the duplex printing restriction information 204. That is, the user 1 can perform color printing, and make a setting for single-sided or two-sided printing. On the other hand, a user 2, who is indicated in a row 212, can perform only monochromatic printing, and can make a setting for single-sided or two-sided printing.

A user enters a user name and a password in logging on to the host computer 101. The host computer 101 sends the information to the authentication server 102. The authentication server 102 collates the user name in a column 201 and the password in a column 202. When authentication is successfully performed, the authentication server 102 notifies the host computer 101 of information indicating restriction on color printing and duplex printing. For example, when authentication of the user 2 is successfully performed, information "mono", which indicates restriction on color printing, and information "none", which indicates restriction on duplex printing, are sent from the authentication server 102 to the host computer 101.

When actually performing printing of a print job, the host computer 101, in consideration of the information "mono" indicating restriction on color printing, and the information "none" indicating restriction on duplex printing, recognizes that color printing cannot be performed, and does not allow the user 2 to perform a color printing setting. Alternatively, the host computer 101 automatically sets the apparatus to monochromatic printing at the time of production of a print job.

FIG. 3 illustrates a configuration of the image forming apparatus 103. A controller unit 2000 is connected to a color scanner 2015, which is an image input device, and a color printer 2017, which is an image output device. The controller unit 2000 is also connected to a local area network (LAN) 2054 and a public line (wide area network (WAN)) 2051. The controller unit 2000 is a controller for inputting and outputting image data and device information.

A central processing unit (CPU) 2001 controls the system. A random access memory (RAM) 2002 is a system work memory for operation of the CPU 2001, and is an image memory for temporarily storing image data. A read only memory (ROM) 2003 is a boot ROM that stores a boot program of the system. An HDD 2004 is a hard disk drive that stores system software (system program) and image data. An operation unit interface (I/F) 2005 constitutes interface with an operation unit (user interface (UI)) 2006, and outputs to the operation unit 2006 image data that is displayed on the operation unit 2006. The operation unit I/F 2005 serves to transmit information entered by a user of the system, from the operation unit 2006 to the CPU 2001.

A network 2007 is connected to the LAN 2054. Information is input and output via the network 2007. A modem 2050 is connected to the public line 2051 to input and output image data. A binary image rotation unit 2052 and a binary image compression/decompression unit 2053 change a direction of an image before sending binary image data by the modem 2050, and convert a resolution of an image to a given resolution or to a resolution corresponding to a capacity of a reception side. As to compression and decompression, a Joint Bi-level Image Experts Group (JBIG) standard, a modified modified read (MMR) coding, a modified read (MR) coding, and a modified Huffman (MH) coding are supported. It will be appreciated that different methods of compression/decompression can be supported. A direct memory access controller (DMAC) 2009 reads and transfers image data stored in the RAM 2002 to an image bus I/F 2011, without going through the CPU 2001. Alternatively, the DMAC 2009 writes image data from an image bus onto the RAM 2002 without going through the CPU 2001. The devices described above are connected to a system bus 2008.

The image bus I/F 2011 is an interface for controlling high speed input and output of image data via an image bus 2010. A compression device 2012 JPEG-compresses image data in a unit of 32 pixels×32 pixels before transmitting the image data to the image bus 2010. A decompression device 2013 decompresses the image data sent via the image bus 2010.

A raster image processor (RIP) 2018 receives page description language (PDL) data from the host computer 101 via the network 2007. The RIP 2018 provides the PDL data to the CPU 2001 via the system bus 2008. The CPU 2001 temporarily stores the received PDL data into the RAM 2002 and then converts the PDL data into intermediate data. Then, the CPU 2001 inputs the intermediate data into the RIP 2018 again via the system bus 2008, and then rasterizes the intermediate code into bitmap image data (multivalued data). A scanner image processing unit 2014 performs appropriate image processing (such as correction and editing) to color image data or monochromatic image data sent from the color scanner 2015 and outputs the image data (in a form of multivalued data). Likewise, a printer image processing unit 2016 performs appropriate image processing (such as correction and editing) to image data to be printed. At the time of printing, binary-to-multivalued conversion is performed to the image data by the decompression device 2013 so that binary output and multivalued output can be performed.

An image conversion unit 2030 has various image conversion functions used in converting image data on the RAM 2002 and writing back to the RAM 2002. A rotation device 2019 is capable of rotating image data of 32 pixels×32 pixels at a specified angle, and inputting and outputting binary and multivalued data. A magnification device 2020 has a function for converting a resolution of image data (e.g., from 600 dpi to 200 dpi) and magnifying (e.g., from 25% to 400%) image data. The magnification device 2020, before performing magnification, arranges image data of 32 pixels×32 pixels into image data in a unit of 32 lines.

A color space conversion unit 2021 converts multivalued input image data using a matrix computation and a lookup table (LUT) conversion. For example, the color space conversion unit 2021 converts YUV image data on a memory into Lab image data and stores the converted image data on the memory. A binary-to-multivalued conversion unit 2022 converts binary image data of 1 bit into multivalued image data of 8 bits and 256 gradations. On the other hand, a multivalued-to-binary conversion unit 2026 converts image data of 8 bits and 256 gradations existing on a memory, into image data of 1 bit and 256 gradations by a method such as error diffusion processing, and stores the converted image data onto the memory. A synthesis unit 2023 has a function of synthesizing data of two multivalued images (or two binary images) into data of one multivalued image (or one binary image).

A thinning unit 2024 performs a resolution conversion by thinning out pixels in multivalued image data. The thinning unit 2024 is capable of outputting ½, ¼, and ⅛ multivalued image data. When the thinning unit 2024 performs processing together with the magnification unit 2020, the thinning unit 2024 can perform magnification and reduction in a wider range. A moving unit 2025 is capable of outputting input binary image data and multivalued image data after adding a margin thereto and deleting a margin therefrom.

Each of the rotation device 2019, the magnification device 2020, the color space conversion unit 2021, the binary-to-multivalued conversion unit 2022, the synthesis unit 2023, the thinning unit 2024, the moving unit 2025, and the multivalued-to-binary conversion unit 2026 can operate in interlock with the other devices and units. Each function, for example, when performing image rotating and converting a resolution of multivalued image data on a memory, can be performed in conjunction with each other without using a memory.

When raster image data is necessary for facsimile transmission, conversion from packet image data to raster image data is performed by software (program), via the binary image rotation unit 2052, or the binary image compression/decompression unit 2053.

Figure 4:
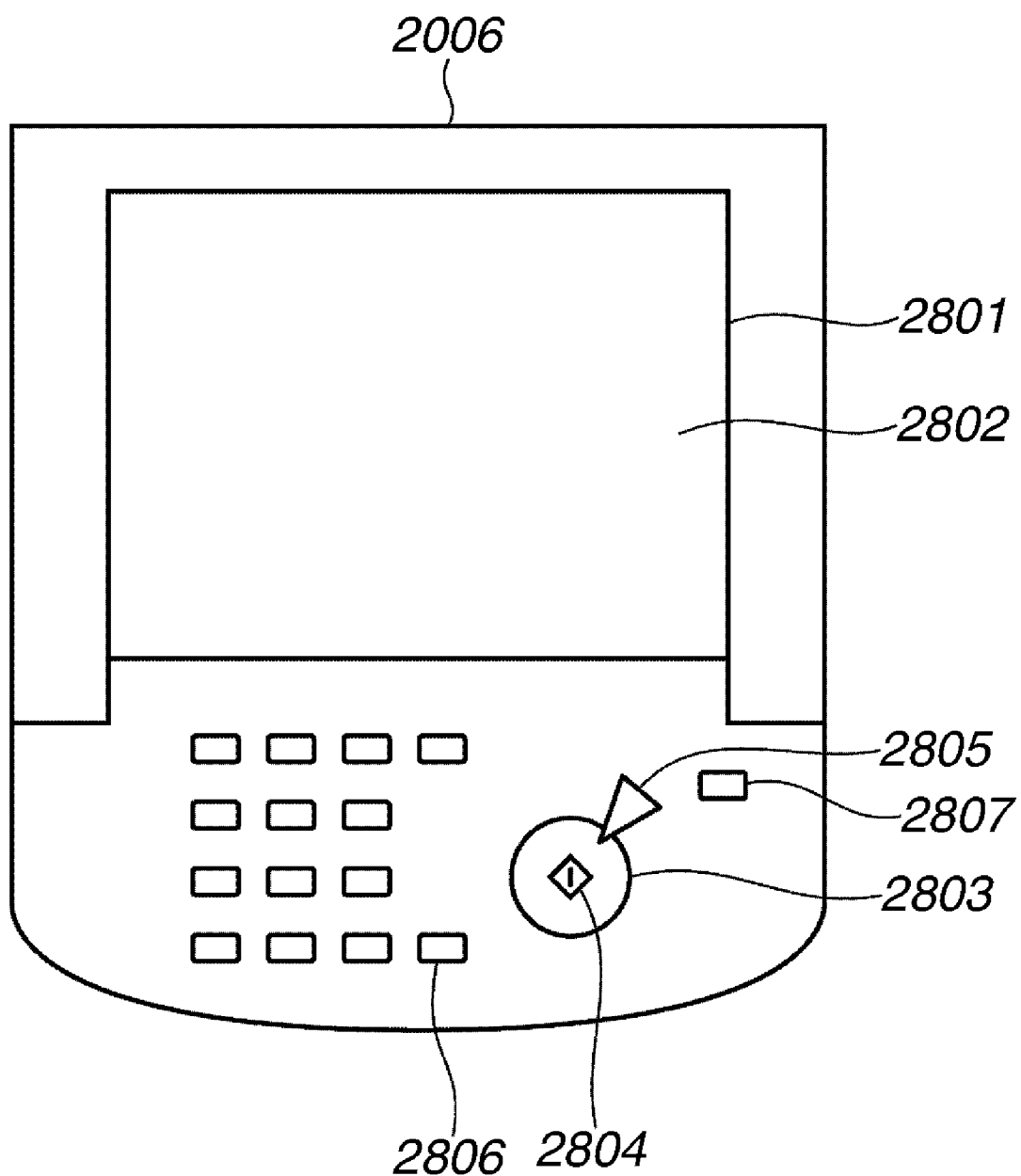
FIG. 4 illustrates a configuration of an operation unit according to an exemplary embodiment of the present invention.

FIG. 4 illustrates an example of a configuration of the operation unit 2006. A liquid crystal display (LCD) unit 2801 includes a touch panel sheet 2802 attached onto an LCD. The LCD unit 2801 displays a system operation screen and soft keys. When the displayed soft keys are pressed by a user, the LCD unit 2801 sends positional information of the pressed soft key to the CPU 2001. A start key 2803 is pressed when starting an operation for reading an original image. In a center portion of the start key 2803, there are provided two color light-emitting diodes (LEDs) 2804 of green and red. The color of the LEDs 2804 indicates whether the start key 2803 is in a usable state. A stop key 2805 is operated to stop the current operation. An ID key 2806 is used to input a user ID. A reset key 2807 is used to initialize the setting made by the operation unit 2006.

Figure 5:
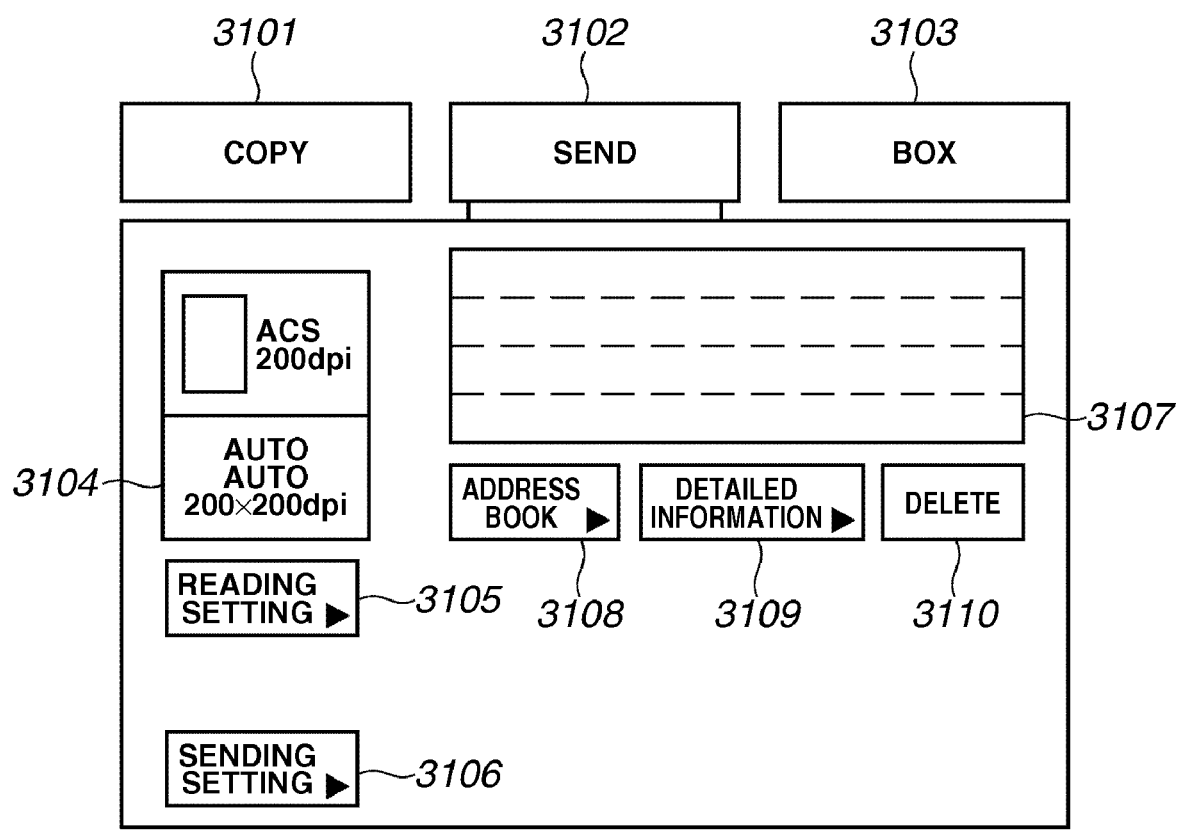
FIG. 5 illustrates an initial screen displayed by an LCD unit of the image forming apparatus according to an exemplary embodiment of the present invention.

FIG. 5 illustrates one example of an initial screen displayed by the LCD unit 2801 of the image forming apparatus 103. The initial screen illustrated in FIG. 5 is also a standard screen to which the display returns after setting each function of the image forming apparatus 103.

A button 3101 is operated to switch to a screen for performing a setting for copying. A button 3102 is operated to switch to a screen for performing a setting for sending scan image data of a scanned image via facsimile or electronic mail. A button 3103 is operated to switch to a box screen. Via a box screen, a user can issue an instruction to store scan image data and PDL image data into a built-in HDD. Alternatively, via a box screen, a user can issue an instruction to print or send the stored scan image data and PDL data. Alternatively, via a box screen, a user can issue an instruction to edit the stored scan image data and PDL data. A window 3104 displays a setting for reading an image performed by a reading setting button 3105. A button 3105 is operated to set the resolution and density at the time of reading an image. A button 3106 is operated to set a timer when sending time, and to set various settings for sending the image data via facsimile or electronic mail. A portion 3107 displays a sending destination specified by an address book 3108. A button 3109 is operated to display detailed information of a destination displayed in the portion 3107. A button 3110 is operated to delete a destination displayed in the portion 3107.

Figure 6:
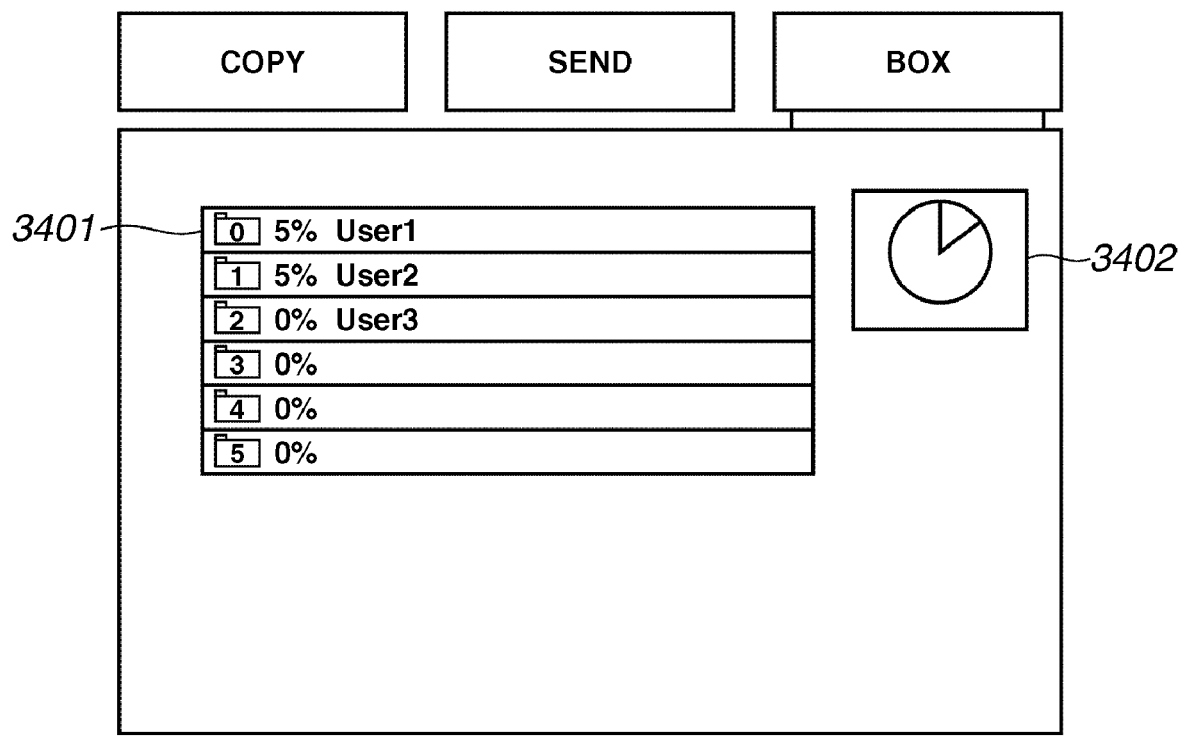
FIG. 6 illustrates a screen displayed in the LCD unit of the image forming apparatus when a user presses a box tab according to an exemplary embodiment of the present invention.

FIG. 6 illustrates one example of a screen displayed in the LCD unit 2801 of the image forming apparatus 103 when a user presses the box tab 3103. Each folder 3401 is obtained by logically dividing the HDD 2004. This folder is also referred to as a "box". A folder number is previously allocated to each folder. The folder 3401 denotes a folder having a folder number "0". On the side of the folder number, a ratio of a disk capacity used for the folder is displayed. The folder can be provided with an arbitrary name. The folder name is also displayed on the side of the folder number. In a portion 3402, an amount of usage of the whole HDD 2004 is displayed.

Figures 7, 8:
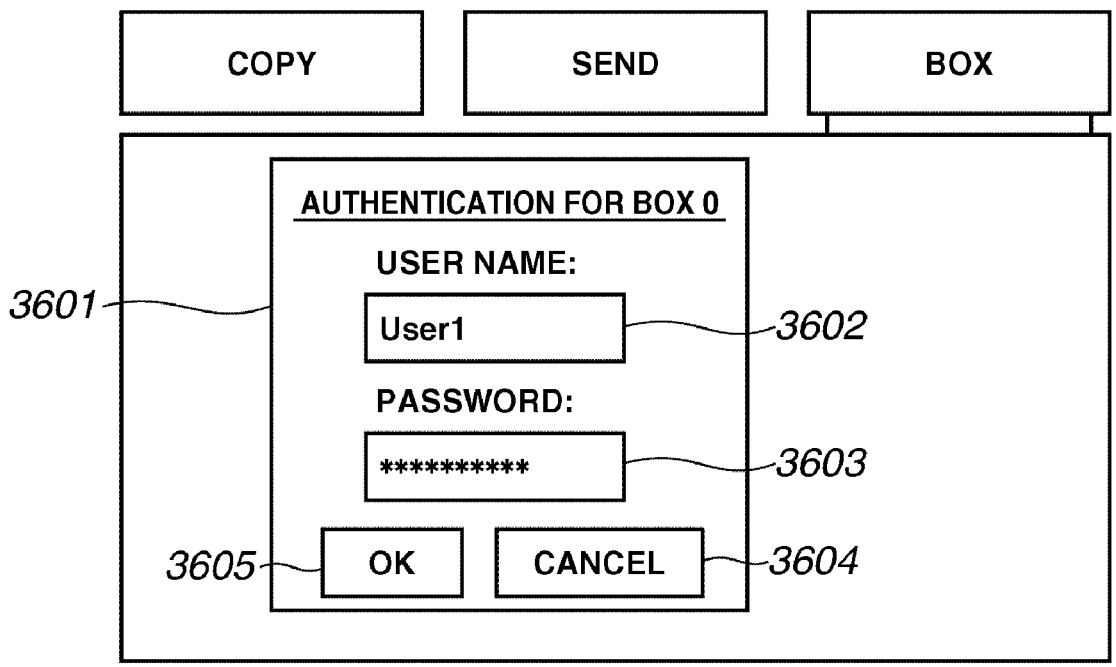
FIG. 7 illustrates an authentication screen shown in the LCD unit of the image forming apparatus according to an exemplary embodiment of the present invention.
FIG. 8 illustrates box management information stored in a hard disk drive (HDD) of the image forming apparatus according to an exemplary embodiment of the present invention.

In this exemplary embodiment, the image forming apparatus 103 manages and controls access to each box from a user, based on authentication information (see FIG. 2 and the like) stored in the authentication server 102. When the user selects a box of a box number "0", the image forming apparatus 103 displays an authentication screen such as the one illustrated in FIG. 7. FIG. 7 illustrates one example of an authentication screen shown in the LCD unit of the image forming apparatus 103.

Referring to FIG. 7, an authentication screen 3601 is used for accessing a box of a box number "0". The authentication screen 3601 includes a user name input field 3602 and a password input field 3603. When the user presses the user name input field 3602 or the password input field 3603, a screen keyboard (not shown) is displayed. The user enters his user name and password via the screen keyboard. Pressing a cancel button 3604 returns to the previous screen without performing any processing.

Figure 9:
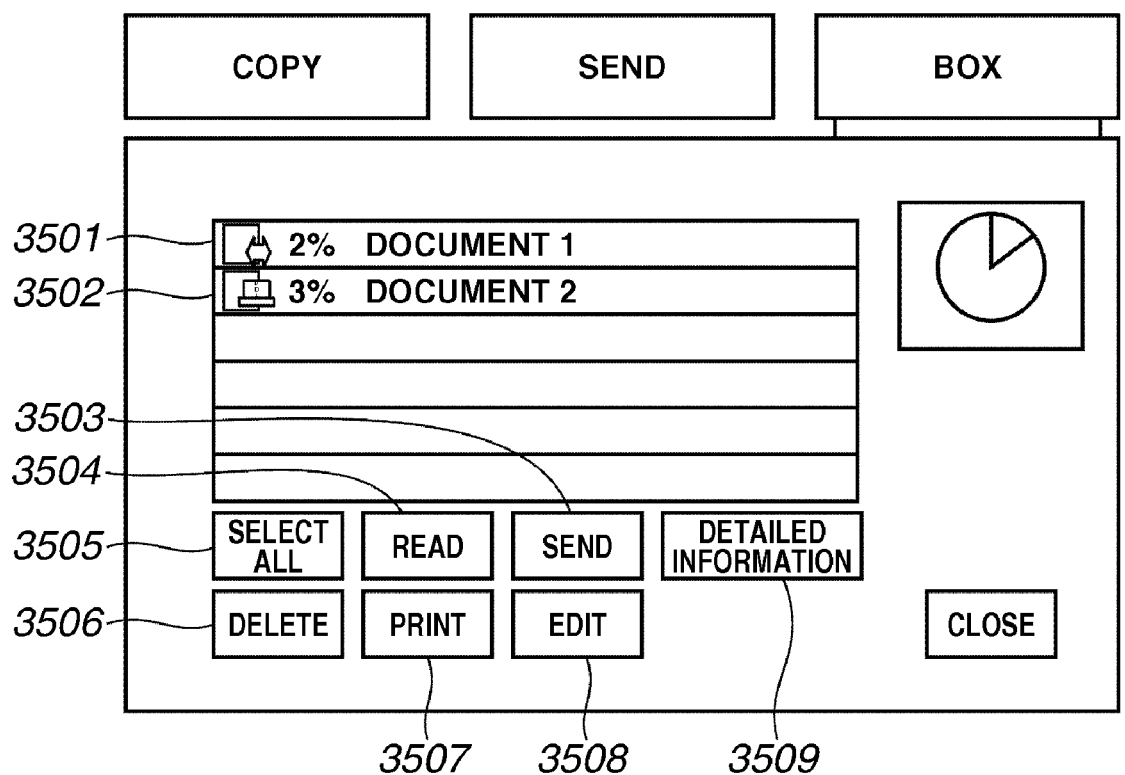
FIG. 9 illustrates details of a box screen displayed in the LCD unit of the image forming apparatus according to an exemplary embodiment of the present invention.

FIG. 8 illustrates one example of box management information stored in the HDD 2004 of the image forming apparatus 103. When an OK button 3605 is pressed by a user, the image forming apparatus 103 acquires a name of a user having an authority to access to a box of a box number "0". Then, the image forming apparatus 103 compares the user name entered in the input field 3602 with a user name acquired from the box management information. If the two user names match each other, the image forming apparatus 103 sends the user name entered in the input field 3602 and the password entered in the input field 3603, to the authentication server 102. When the entered user name and password are successfully authenticated, the image forming apparatus 103 shifts the screen of the LCD unit 2801 from the screen illustrated in FIG. 7 to the screen illustrated in FIG. 9. When the entered user name and password are not successfully authenticated, the image forming apparatus 103 shifts the screen of the LCD unit 2801 from the screen illustrated in FIG. 7 to an error screen. FIG. 9 illustrates details of a box screen displayed in the LCD unit 2801 of the image forming apparatus 103. In the error screen, a message indicating "Entered user name or password is incorrect. Check your user name or password and enter again" is displayed. The image forming apparatus 103 receives information indicating whether the authentication is successfully done or not from the authentication server 102.

Referring to FIG. 9, documents 3501 and 3502 are stored in a box. A document includes one or more pages. The document 3501 is produced by reading an original (that is, the document 3501 is a scan document). In the field 3501, an icon indicating that the document is a scan document, a ratio of capacity used by the document, and a document name of the document are displayed. The document name can be arbitrarily set by a user. In the field 3502, an icon indicating that the document is produced based on PDL data (PDL document), is displayed. When the user presses the icon, the icon is reversely displayed to indicate that the document is selected. A button 3503 is used to send a selected document. A button 3504 is used to read an original from a scanner to produce a document.

A button 3505 is used to select all the documents in a box. A button 3506 is used to delete the selected document. A button 3507 is used to print the selected document. A button 3508 is used to edit the selected document. The image forming apparatus 103 includes a function of combining two selected documents, storing the combined one as one document and deleting a specific page in the selected document. A button 3509 is used to display detailed information of the document that is last selected. By operating the button 3509, the user can check information such as resolution, size of an original, color, and the like, as well as the document name.

Figure 10:
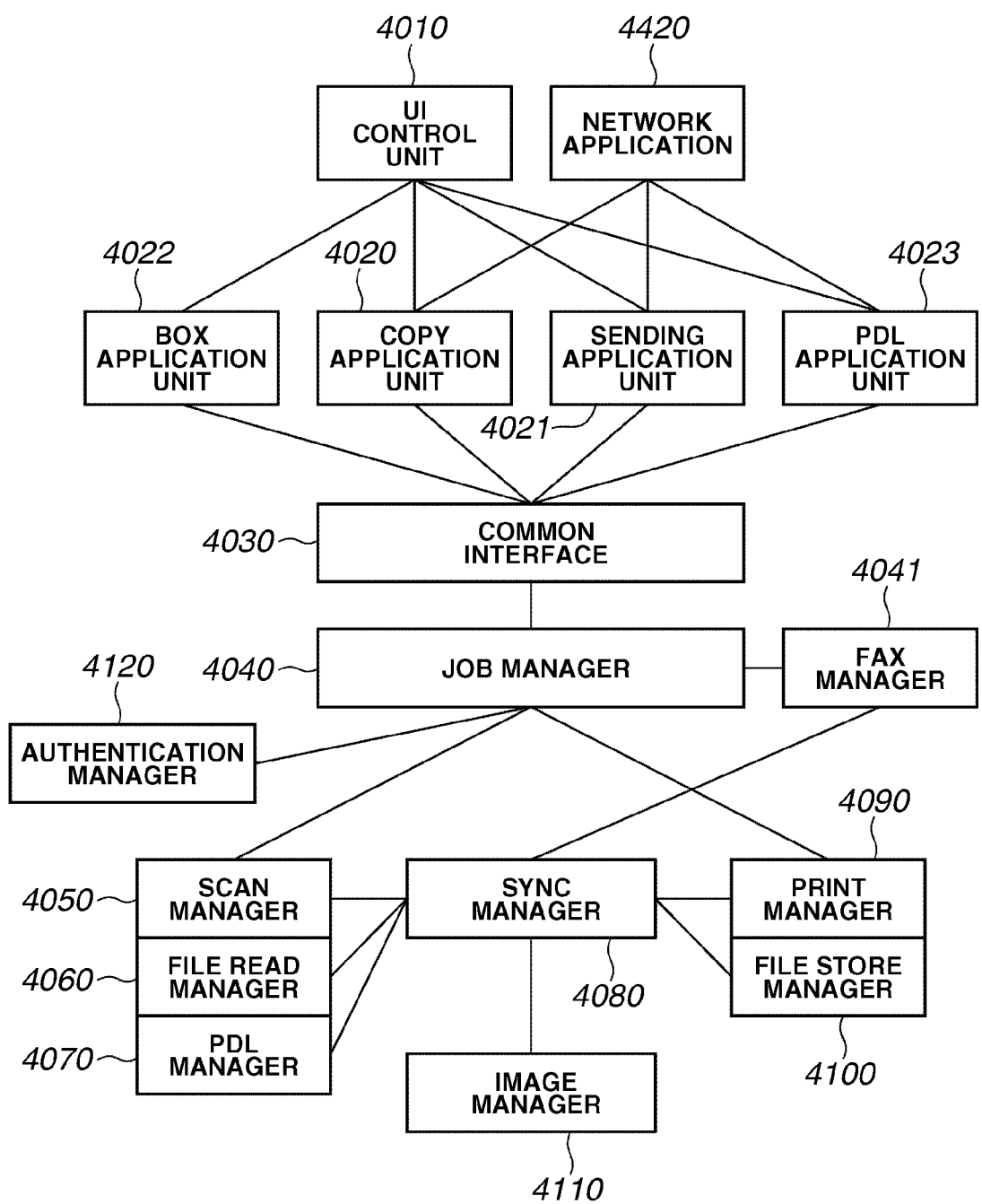
FIG. 10 illustrates a software configuration of the image forming apparatus according to an exemplary embodiment of the present invention.

FIG. 10 illustrates one example of a software configuration of the image forming apparatus 103. A user interface (UI) control unit 4010 controls a user interface of the operation unit 2006. A copy application unit 4020 performs a copying operation upon receiving an instruction from the UI control unit 4010. A sending application unit 4021 performs a sending operation upon receiving an instruction from the UI control unit 4010. A box application unit 4022 stores a document into a box and prints a document saved in a box (box printing) upon receiving an instruction from the UI control unit 4010.

A PDL application unit 4023 receives PDL data from a network application 4420. A common interface 4030 accommodates device-dependent portions of a device controlling unit. A job manager 4040 arranges job information received from the common interface 4030 and transmits the arranged job information to a document processing unit. An authentication manager 4120 performs authentication processing between the image forming apparatus 103 and the authentication server 102 when an authentication service by the authentication server 102 is necessary for a job that the job manager 4040 receives.

In local copying, a scan manager 4050 and a print manager 4090 are equivalent to a document processing unit. In addition, in a case where a scan job or a sending job is performed in remote copying, the scan manager 4050 and a file store manager 4100 are equivalent to a document processing unit. In a case where a received job is performed in remote copying, a file read manager 4060 and the print manager 4090 are equivalent to a document processing unit. Further, in a case where PDL printing is performed such as logical inference per second (LIPS) and PostScript, the PDL manager 4070 and the print manager 4090 are equivalent to a document processing unit. Synchronization among document managers, and request to perform image processing to an image manager 4110, which performs various image processing, are carried out via a synchronization manager 4080. The image manager 4110 performs image processing and storing of an image file at the time of scanning and printing.

In the case of a print job in which storing of PDL data is specified, the print job is transmitted to the PDL application unit 4023 via the network application 4420. The PDL application unit 4023 transfers the print job in which storing of PDL data is specified, to the job manager 4040 via the common interface 4030. At this time, the file store manager 4100 stores PDL data into the HDD 2004 upon receiving a request from the job manager 4040.

In the case of printing a document stored in a box (box printing), the UI control unit 4010 issues to the box application unit 4022 a print job based on a document whose printing is instructed by the operation unit 2006. The box application unit 4022 inputs the print job into the job manager 4040 via the common interface 4030.

Then, the file read manager 4060 receives a request from the job manager 4040. The file read manager 4060 reads the PDL data of the document whose printing is instructed from the HDD 2004. Then, the file read manager 4060 transfers to the PDL manager 4070, the request and the read PDL data for rasterizing onto a memory, via the synchronization manager 4080. The PDL manager 4070 receives the PDL manager data and rasterizes the PDL data into bitmap data so that printing and displaying can be performed. Then, the PDL manager 4070 issues a request for image processing to the image manager 4110 via the synchronization manager 4080. The image manager 4110 performs a setting of the printer image processing unit 2016 and notifies completion of print preparations to the print manager 4090 via the synchronization manager 4080. Then, the print manager 4090 issues an instruction to perform printing to the color printer 2017. Then, the color printer 2017 performs printing based on the bitmap data. In the case where instead of the PDL data, the bitmap data produced by rasterizing PDL data is stored in a box as a document, the rasterization process of PDL data by the PDL manager 4070 is skipped.

Figure 11:
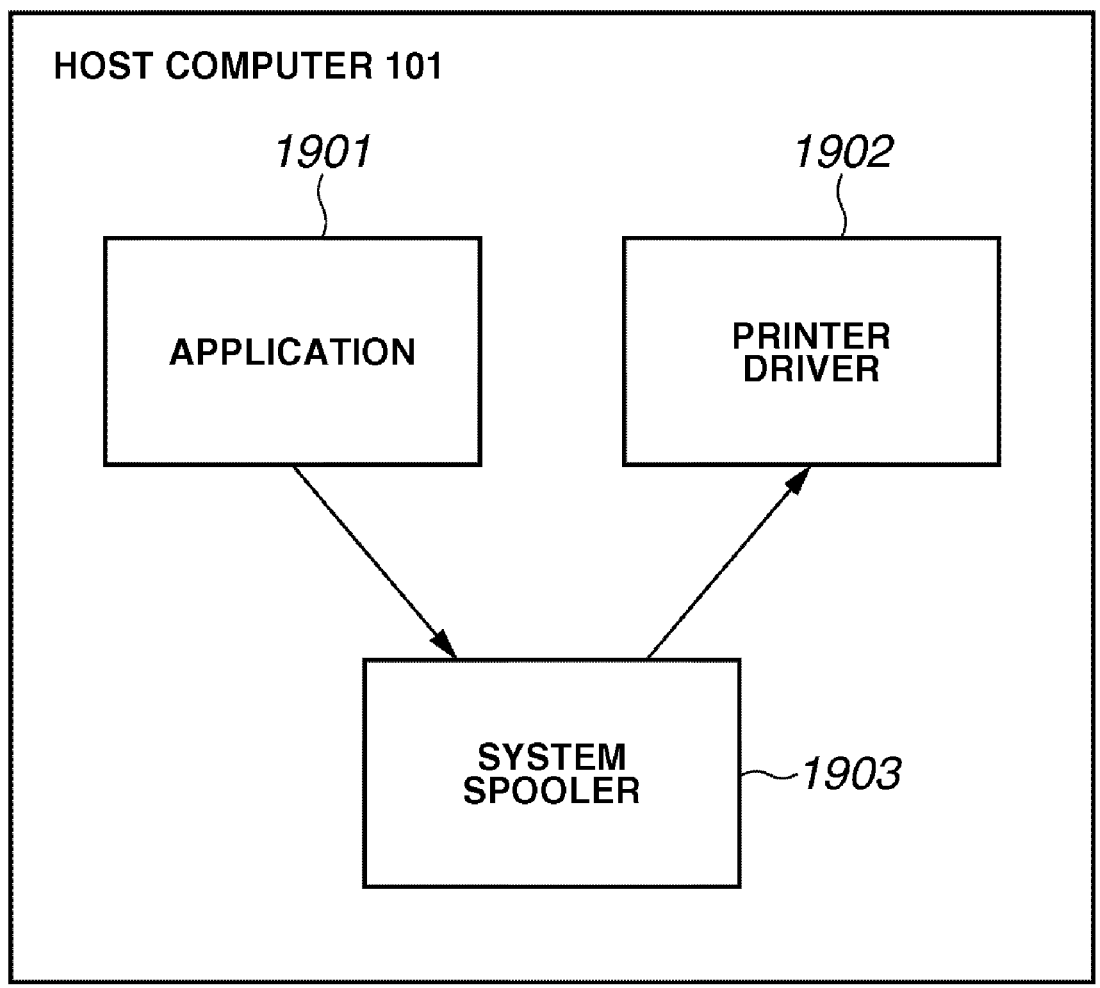
FIG. 11 illustrates a module concerning a print setting on a host computer according to an exemplary embodiment of the present invention.

FIG. 11 illustrates one example of a software configuration of the host computer 101. Referring to FIG. 11, an application 1901, a printer driver 1902, and a system spooler 1903 are a program module that is executed by an operating system (OS) and a module utilizing the module of the OS.

Figure 12:
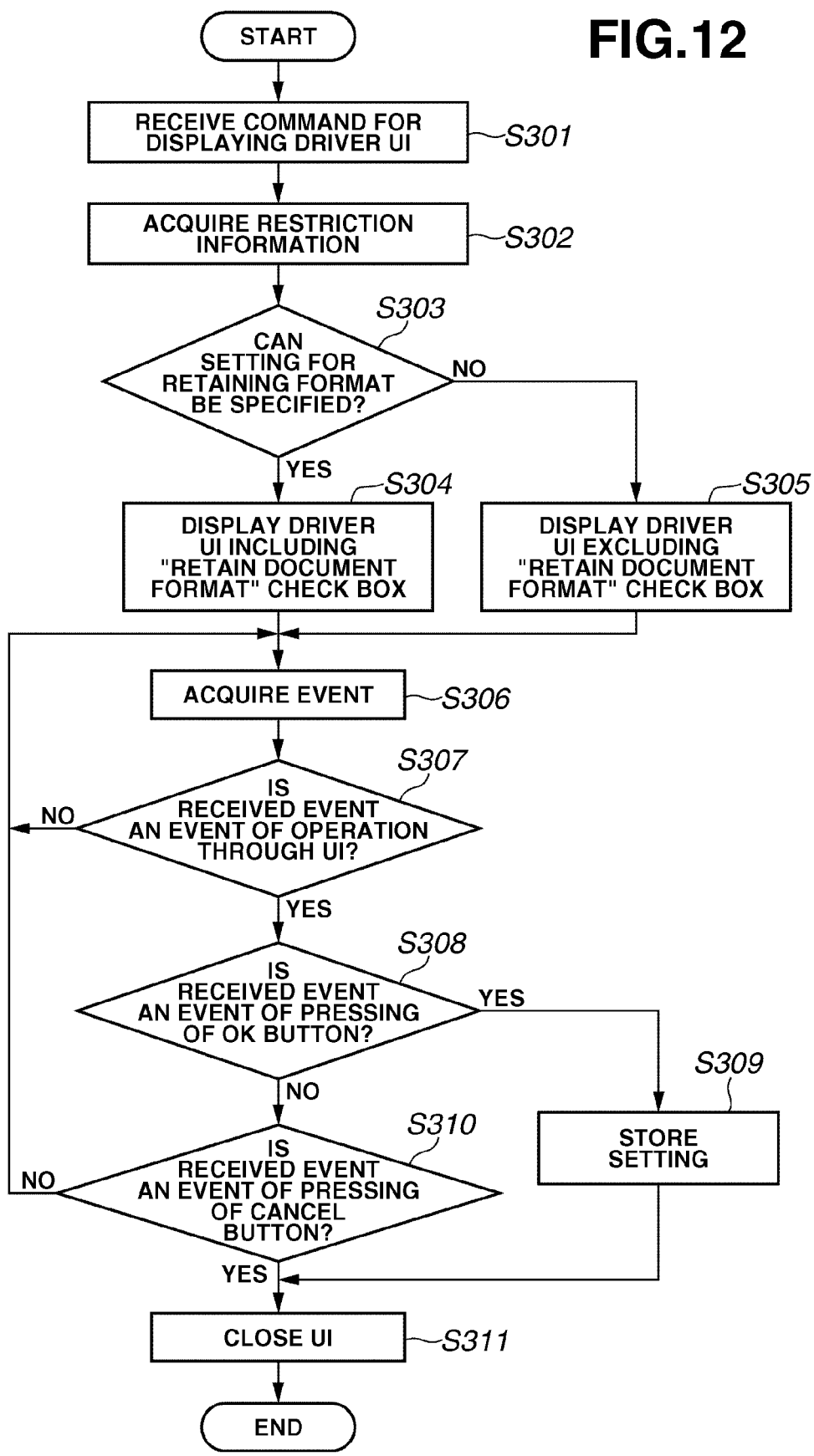
FIG. 12 is a flow chart illustrating a print job setting processing according to an exemplary embodiment of the present invention.

Now, a print setting process is described which is performed before sending a print job from the host computer 101 to the image forming apparatus 103. FIG. 12 is a flow chart illustrating one example of a print setting process.

First, in step S301, when the application 1901 executes an application program interface (API) for opening a publicized driver UI from the system spooler 1903, the system spooler 1903 sends a command for displaying the driver UI, to the printer driver 1902.

In step S302, when the printer driver 1902 receives the command for displaying the driver UI, the printer driver 1902 acquires restriction information of a user from the authentication server 102. In the present exemplary embodiment, it is assumed that the user 1 instructs printing. Accordingly, the printer driver 1902 acquires the restriction information of the user 1 in step S302. Note that the restriction information acquired at this time is restriction information about each individual user as illustrated in FIG. 2. FIG. 2 illustrates a database that stores authentication information and restriction information about each user maintained by the authentication server 102.

Figure 13:
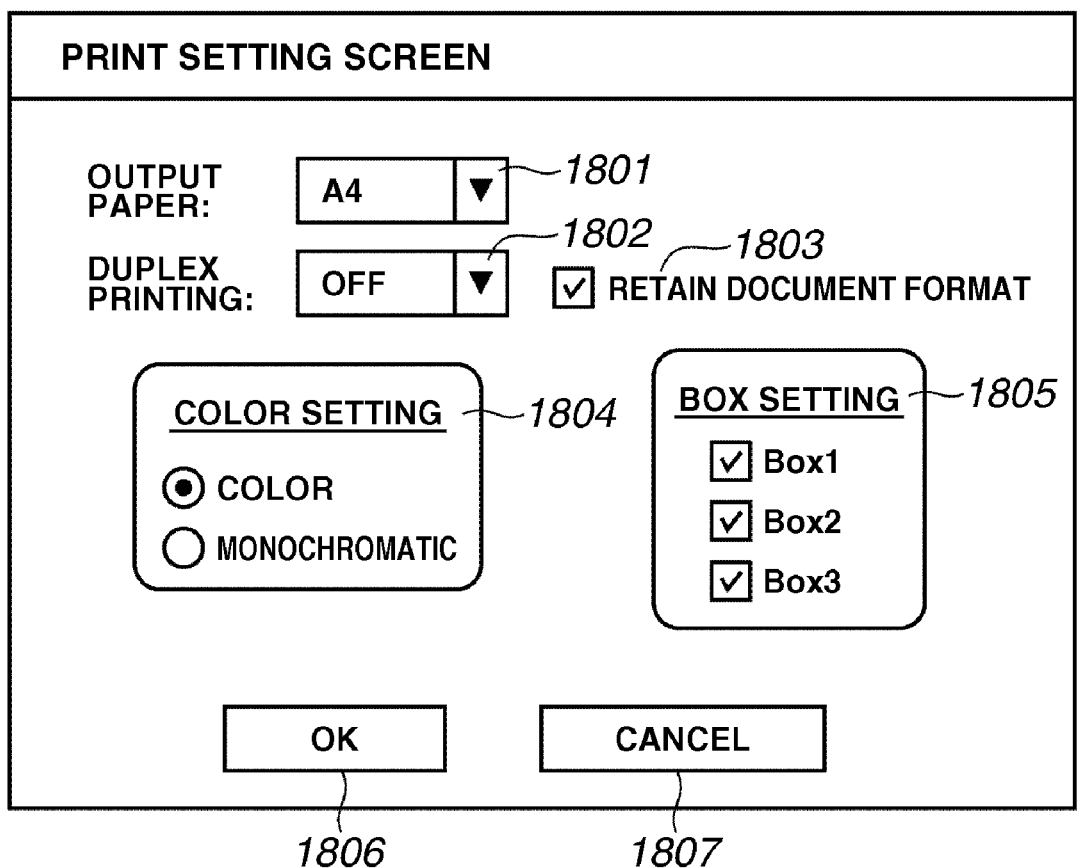
FIG. 13 illustrates a print setting screen according to an exemplary embodiment of the present invention.

In step S303, after acquiring the restriction information, the printer driver 1902 refers to format retainment restriction information 205 to determine whether the user is authenticated for retaining a document format. If it is determined in step S303 that the user is authenticated for retaining the format (Yes in step S303), the printer driver 1902 displays a check box 1803 indicating "retain document format" on the driver UI in step S304, as illustrated in FIG. 13. FIG. 13 illustrates one example of a print setting screen in the driver UI.

Referring to FIG. 13, the driver UI includes an output paper specifying control 1801, a duplex printing setting control 1802, a print job format retainment setting control 1803, a color setting control 1804, a box setting control 1805, an OK button 1806, and a cancel button 1807. Here, when a check box of the print job format retainment setting control 1803 is checked, an attribute that the document format of the print job is retained, is added to the print job by the printer driver 1902. When the user checks a box number in the box setting control 1805 into which the user desires to input a document produced based on PDL data, the document is stored into the box concerned in the image forming apparatus 103.

On the other hand, if the document format cannot be retained (no in step S303), the printer driver 1902 displays the driver UI excluding the "retain document format" check box as illustrated in FIG. 14 (step S305). FIG. 14 illustrates one example of a print setting screen in the driver UI.

After displaying the driver UI (in step S304 or step S305), in step S306, the printer driver 1902 acquires an event. In step S307, the printer driver 1902 determines whether the acquired event is the UI operation. If it is determined in step S307 that the event is the UI operation (Yes in step S307), then in step S308, the printer driver 1902 determines whether the event acquired in step S306 is pressing of the OK button 1806. If it is determined in step S308 that the event acquired in step S306 is pressing of the OK button 1806 (Yes in step S308), then in step S309, the printer driver 1902 stores information about the print setting made via the current driver UI. Then, in step S311, the printer driver 1902 closes the driver UI and ends the processing illustrated in FIG. 12. The print setting information stored here is, in most cases, binary data named "DEVMODE" in Windows® of Microsoft Corporation or XML data referred to as a print ticket.

On the other hand, if it is determined in step S308 that the event acquired in step S306 is not pressing of the OK button 1806 (No in step S308), then in step S310, the printer driver 1902 determines whether the event acquired in step S306 is pressing of the cancel button 1807. If it is determined in step S310 that the event acquired in step S306 is pressing of the cancel button 1807 (Yes in step S310), then the printer driver 1902 closes the driver UI (step S311) and ends the processing illustrated in FIG. 12. On the other hand, if it is determined in step S310 that the event acquired in step S306 is not pressing of the cancel button 1807 (No in step S310), then processing returns to step S306 and the printer driver 1902 waits for another event. Likewise, if it is determined that the acquired event is not an event of the UI operation (No in step S307), processing returns to step S306 and the printer driver 1902 waits for another event.

Figure 15:
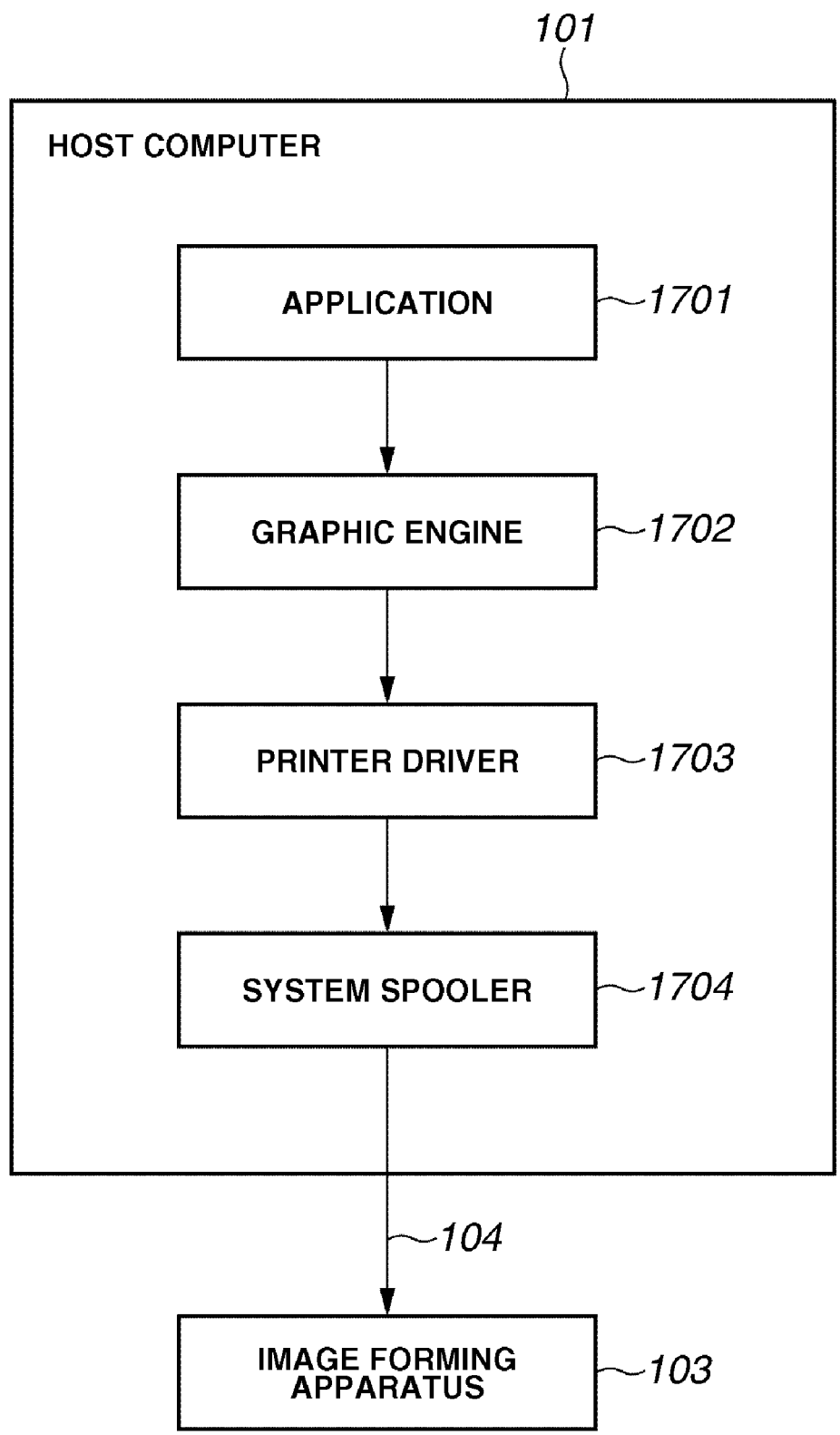
FIG. 15 illustrates typical processing for sending a print job performed by the host computer according to an exemplary embodiment of the present invention.

Now, the processing for sending a print job from the host computer 101 to the image forming apparatus 103 is described. FIG. 15 illustrates typical processing for sending a print job performed by the host computer 101.

Referring to FIG. 15, an application 1701, a graphic engine 1702, a printer driver 1703, and a system spooler 1704 are program modules executed by an OS or a module utilizing the module of the OS. The graphic engine 1702 is utilized in issuing a print job from the application 1701 to the image forming apparatus 103. The graphic engine 1702 produces a print job illustrated in FIG. 18 or FIG. 19, using the printer driver 1703 provided to each of the image forming apparatus 103. The print job is described below. The produced print job is output to the printer driver 1703 via the system spooler 1704 and the network 104.

Figure 16:
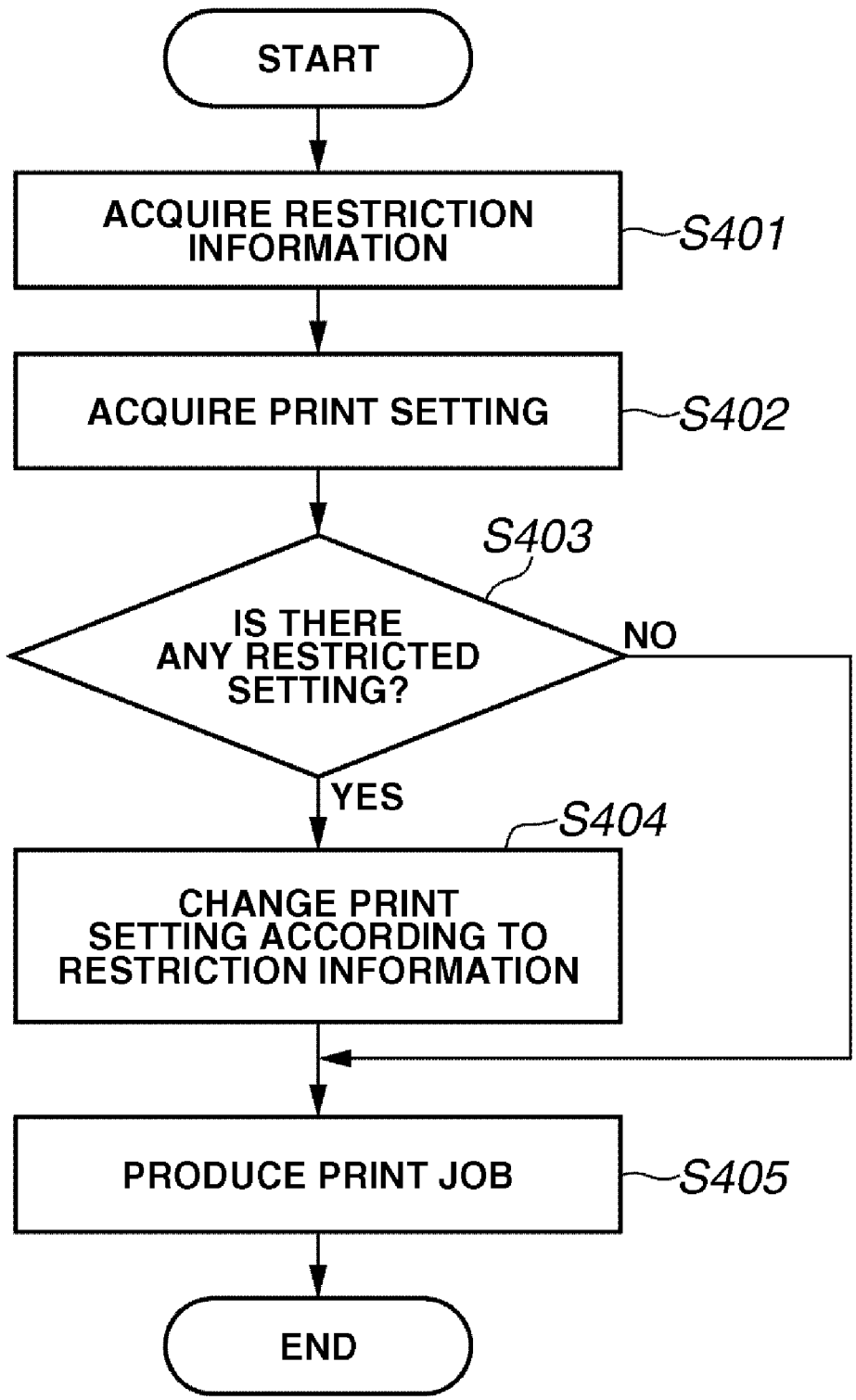
FIG. 16 is a flow chart illustrating processing by a printer driver according to an exemplary embodiment of the present invention.

FIG. 16 is a flow chart illustrating one example of processing performed by the printer driver 1703. After a user performs an operation for instructing printing and before a print job to which restriction information is added is produced, the printer driver 1703 performs the processing illustrated in FIG. 16.

First, in step S401, the printer driver 1703 acquires restriction information of the user from the authentication server 102. In step S402, the printer driver 1703 acquires print setting information. The print setting information acquired here indicates the print setting specified through the driver UI described in the flow chart of FIG. 12.

In step S403, the printer driver 1703 compares the restriction information acquired in step S401 and the print setting acquired in step S402 to determine whether print restriction is necessary. For example, in the case of the restriction information for the user 2 illustrated in FIG. 2, "mono" (monochromatic) is specified for the color restriction information 203. In such a case, if color printing is specified for the print setting information acquired in step S402, the printer driver 1703 determines that there are restricted settings (Yes in step S403), and in step S404, changes the specification for color printing in the print setting information to monochromatic printing, according to the restriction information.

On the other hand, when "color" is specified for the color restriction information just as in the case of the restriction information for the user 1, and when color printing is specified for the print setting information acquired in step S402, the printer driver 1703 determines that there are not restricted settings (No in step S403) and does not perform the processing of step S404 and advances the processing to step S405. In step S405, the printer driver 1703 produces a print job according to final print setting information and then ends the processing.

Now, a form of a print job produced in step S405 of FIG. 16 is described. The print job includes one or more job packets standardized so that start and end of a print job can be readily recognized, and setting of a print job attribute can be easily performed.

FIG. 17 illustrates one example of a configuration of a job packet. A vertical axis indicates a byte, and a horizontal axis indicates a bit of each byte. Referring to FIG. 17, operation code in zeroth to first bytes is an ID of two bytes indicating a function of a packet. In a job packet, following values can be used.

0x0201: job start operation
   0x0202: job attribute setting operation
   0x0204: PDL data sending operation
   0x0205: job ending operation
   0x0301: restriction information operation A block number in second to third bytes is a number used for linking a request and a response. That is, the block number shows which response from a unit receiving a request, corresponds to which request for response issued from a unit sending a job packet. For example, when job packets respectively having a block number "1", "2", or "3" is serially sent and an error packet having a block number "2" is returned, the packet that sends the request can determine that an error has occurred to the job packet that was sent second.

A parameter length in fourth to fifth bytes is an area indicating a length of a byte in a data portion and can indicate zero to 64 K bytes. An area for sixth to seventh bytes indicates various kinds of flags for a job packet. Each flag includes the following content.

Error flag: When a value "1" is set for the error flag, an error has occurred in the image forming apparatus 103. The error flag is added to a response packet sent from the image forming apparatus 103 to the host computer 101.

Notification flag: When a value "1" is set for the notification flag, the image forming apparatus 103 notifies to the host computer 101 that there is some matter to be notified, instead of sending a response to a request packet from the host computer 101.

Continuation flag: When a value "1" is set for the continuation flag, it is indicated that because not all data is included in the data portion, the other data is sent in a next job packet. For the next job packet, it is necessary to set the same operation code as a previous packet.

Request for response: a value "1" is set to ask for response when the host computer 101 issues a request for a response packet to the image forming apparatus 103. When a value "0" is set for the request for response, no response is sent when the sent packet is normally processed. When an error occurs in the image forming apparatus 103, a response packet having an error flag including a value "1" is always sent regardless whether a value "0" or a value "1" is set for the request for response.

Send Response: When a response is sent, e.g., after receiving a packet with the Request Response set to "1," Send Response is set to "1" in the response packet.

Each of a user ID in eighth to ninth bytes and a password in tenth to eleventh bytes is an area used for authentication when a restriction for a security purpose is applied to an operation that can be performed according to the sent packet. The areas are not used in the present exemplary embodiment.

In areas in a twelfth byte and beyond, data corresponding to the operation code is stored. In the case of a job start operation and a job ending operation, no data exists in these areas.

In the case of a job attribute setting operation, a job attribute ID and a job attribute value desired to be set are stored in the data portion. A job attribute ID is an identifier set corresponding to an attribute or an environment concerning a job. To the job attribute ID, an ID equivalent to a job attribute specified by ISO-010175 (DPA) (ISO: International Standards Organization) is previously allocated. Typical job attribute IDs are as follows.

0x0101: job name
   0x0103: job owner name
   0x016a: job size
   0x0174: number of print pages In addition, according to the function of the image forming apparatus 103, a job attribute can be set concerning a number of prints, whether printing is performed in monochromatic or color printing mode, storing of PDL manager data, and a setting for retaining a document format. An ID corresponding to each of the job attributes can be allocated.

Figure 18:
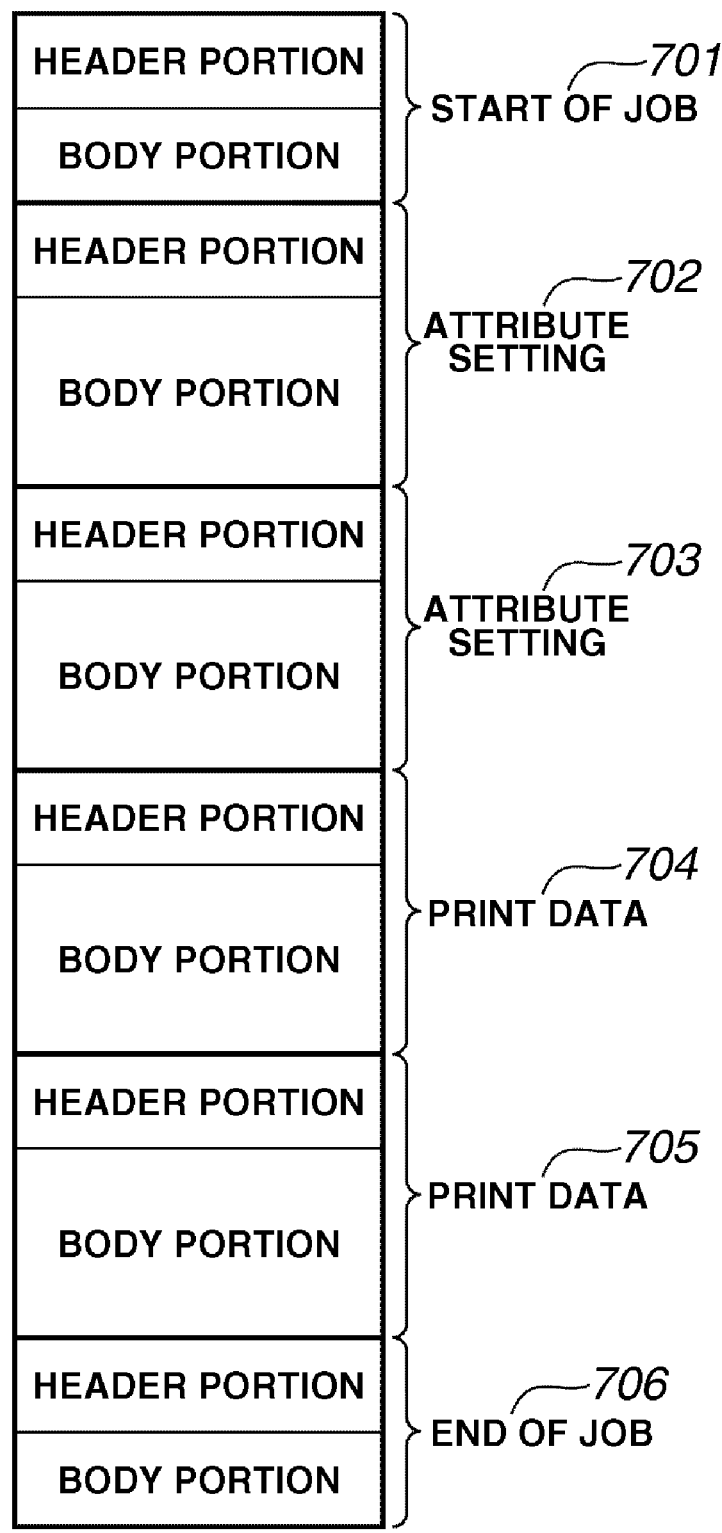
FIG. 18 illustrates a configuration of a print job according to an exemplary embodiment of the present invention, which is simplified for the sake of convenience of description.

FIG. 18 illustrates one example of a configuration of a print job, which is simplified for the sake of convenience of description. Referring to FIG. 18, job packets are sent from the host computer 101 to the image forming apparatus 103 in order from top to bottom.

An area described as a header portion for one packet indicates a fixed area for the zeroth to the eleventh bytes illustrated in FIG. 17. A body portion for one packet indicates a data portion for the twelfth bytes and beyond illustrated in FIG. 17. A print job includes a job packet 701 that declares start of a job. In the job packet 701, operation code in zeroth to first bytes is "0x0201", which indicates a job start operation.

A job packet 702 and a job packet 703 are job packets for setting an attribute such as a job name, a job owner name, and a print condition, for a print job. In the attribute setting job packet, an operation code for zeroth to first bytes is "0x0202" that indicates an attribute setting operation. As illustrated in FIG. 18, in setting a plurality of attributes, a plurality of attribute setting job packets can be added.

A job packet 704 and a job packet 705 are job packets for sending PDL data. In the job packet for sending PDL data, an operation code for zeroth to first bytes is "0x0204" that indicates a PDL data sending operation. When PDL data to be sent cannot be fully included in one job packet, the job packets for sending PDL data can be sent in a plurality of times. A job packet 706 indicates an end of a job.

Figure 19:
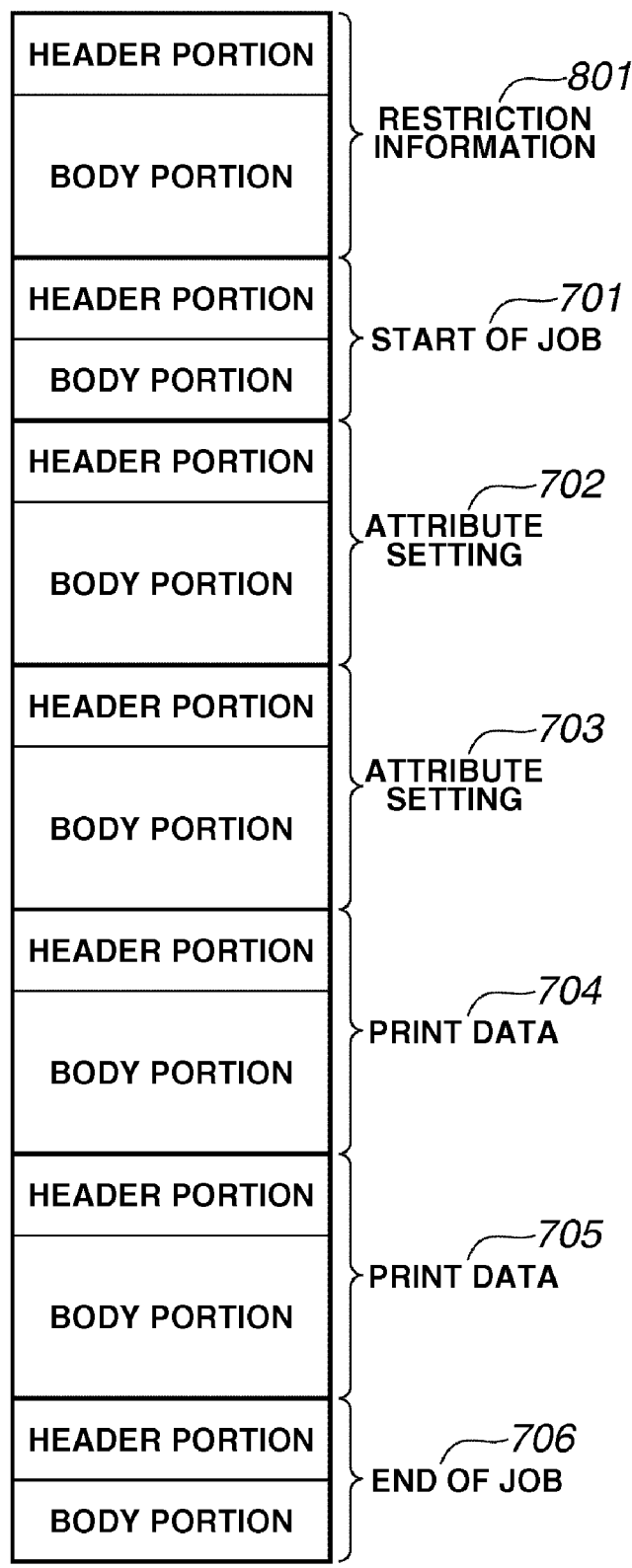
FIG. 19 illustrates a configuration of a print job to which restriction information is added according to an exemplary embodiment of the present invention, which is simplified for the sake of convenience of description.

FIG. 19 illustrates one example of a configuration of a print job to which restriction information is added. FIG. 19 is simplified for the sake of convenience of description. In a print job to which restriction information is added, a job packet 801, which indicates restriction information, is added to a head of the print job. In the job packet 801 indicating restriction information, an operation code for zeroth to first bytes is "0x301" that indicates a restriction information operation. A job packet specified for a restriction information operation includes restriction information in its data portion.

FIG. 20 illustrates one example of a description format of restriction information. Referring to FIG. 20, a character string "Duplex_Restriction" indicates restriction on duplex printing, and a character string "=None" indicates that there is no restriction. Furthermore, a character string "Color_Restriction" indicates restriction on color printing, and a character string "=Mono" indicates that the setting is restricted to monochromatic printing, that is, color printing cannot be performed.

In addition, in order to verify that the restriction information is issued from a proper authentication server 102, a verification by digital signature is performed in the present exemplary embodiment.

FIG. 21 illustrates a job packet for restriction information. Referring to FIG. 21, zeroth to eleventh bytes constitute a header portion and twelfth byte and beyond constitute a data portion. An area 1201 from a head to a "NULL" word includes restriction information, which includes information illustrated in FIG. 20. Remaining 128 bytes 1202 after the "NULL" word indicate a digital signature. This portion certifies that the restriction information is issued from a proper authentication server 102 and that the restriction information is not rewritten midway in an inappropriate method.

For the digital signature, a method using an RSA public key cryptography, for example, is commonly used. With a digital signature using public key system, a digest by a one-way function is produced from an object of signature (in the present exemplary embodiment, restriction information). Then, a signature generating source (in the present exemplary embodiment, the authentication server 102) performs encryption using a private key that the authentication server 102 owns. The signature is verified by the image forming apparatus 103 using a public key. The private key is owned only by the proper authentication server 102. Accordingly, if verification of signature using a correct public key is successfully completed, it can be certified that the object of signature is an authenticated object. The public key used for a digital signature utilizes a pair of public keys owned by the authentication server 102. The public key is transferred in advance from the authentication server 102 to the image forming apparatus 103 before performing printing. For a method of transferring the public key, in the case of using a network, a third party certification utilizing a public key infrastructure (PKI) or a physical distribution using a memory card can be used.

If no restriction information is added to printing of a print job, whether the printing is permitted, is defined as a policy under an environment in which an image forming apparatus is used, for example an office environment. If strict print restriction should be applied, printing of a print job to which no restriction information is added, cannot be permitted. On the other hand, in the case where it is appropriate to apply a print restriction only to a specific user while an image forming apparatus is operated maintaining compatibility with conventional print functions, printing of a print job to which no restriction information is added, can be permitted. This operation policy can be set only by an administrator of the print system via the operation unit 2006.

Likewise, when box printing is performed by the image forming apparatus 103, whether a priority is given to restriction information on a user instructing box printing or to a print setting for a document in a box, is defined as a policy. If the restriction information for a user is given a priority, the image forming apparatus 103 performs print processing according to the restriction information stored in the authentication server 102 regardless of the print setting for the document in a box. On the other hand, if the print setting for the document is given a priority, the image forming apparatus 103 performs printing according to the print setting for the document in a box regardless of the restriction information for the user.

Figure 22:
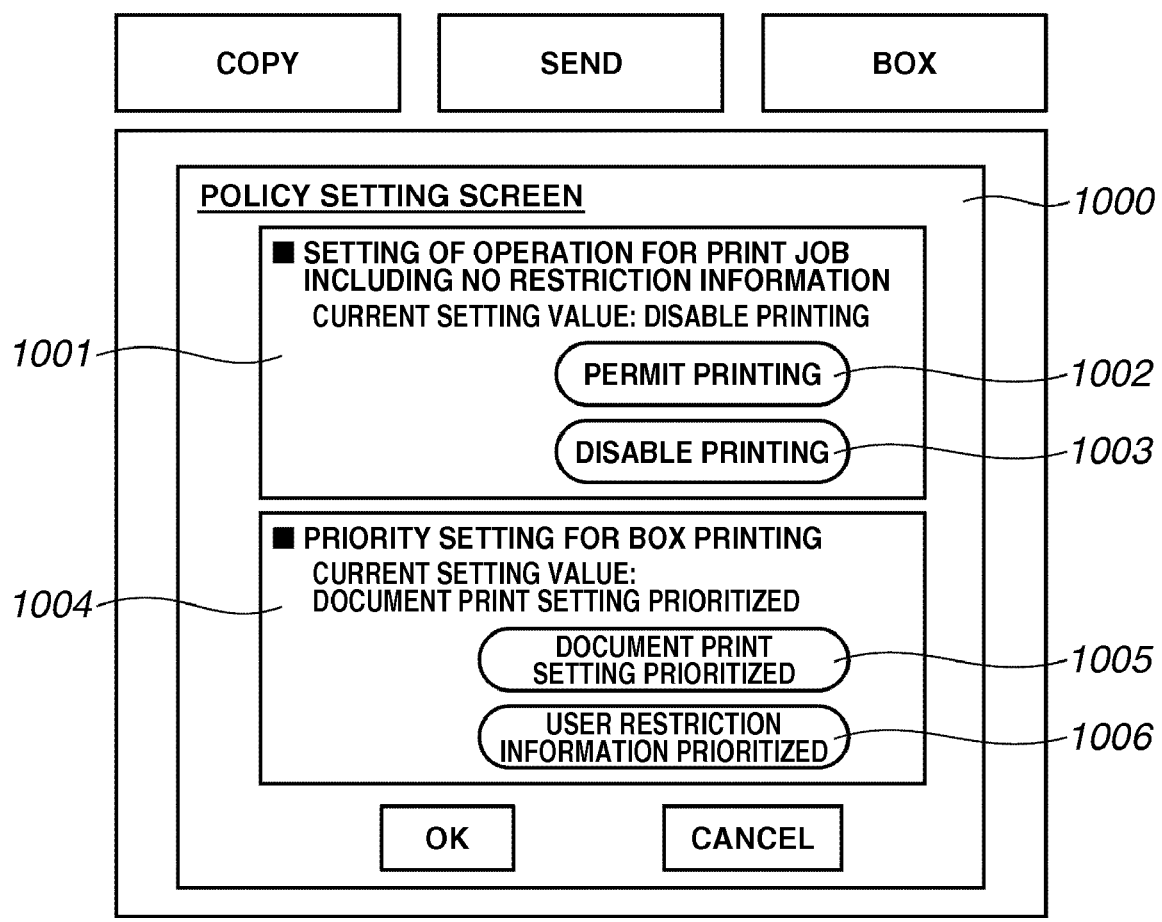
FIG. 22 illustrates a graphical user interface (GUI) screen for setting a policy according to an exemplary embodiment of the present invention.

FIG. 22 illustrates one example of a GUI screen for setting the above-described policy, which is displayed in the operation unit 2006. The GUI screen illustrated in FIG. 22 is displayed only when a user having an authority as an administrator is previously authenticated by a password or a known authentication mechanism such as an integrated circuit (IC) card.

Referring to FIG. 22, the GUI screen includes a policy setting screen 1000. A field 1001 is used for setting an operation performed to a print job to which no restriction information is added. A button 1002 is used for changing a setting to "permit printing". A button 1003 is used for changing a setting to "disable printing". As can be seen from the display in the field 1001, "disable printing (of a print job to which no restriction information is added)" is currently selected.

A field 1004 is used for setting priority items at the time of box printing. A button 1005 is used for changing a setting to "document print setting prioritized". A button 1006 is used for changing a setting to "user restriction information prioritized". As can be seen from the display in the field 1004, "document print setting prioritized" is currently selected.

The policy set via the policy setting screen 1000 (policy setting information) illustrated in FIG. 22 is recorded onto a non-volatile memory such as the HDD 2004 in the image forming apparatus 103 and continuously stored.

Figure 23:
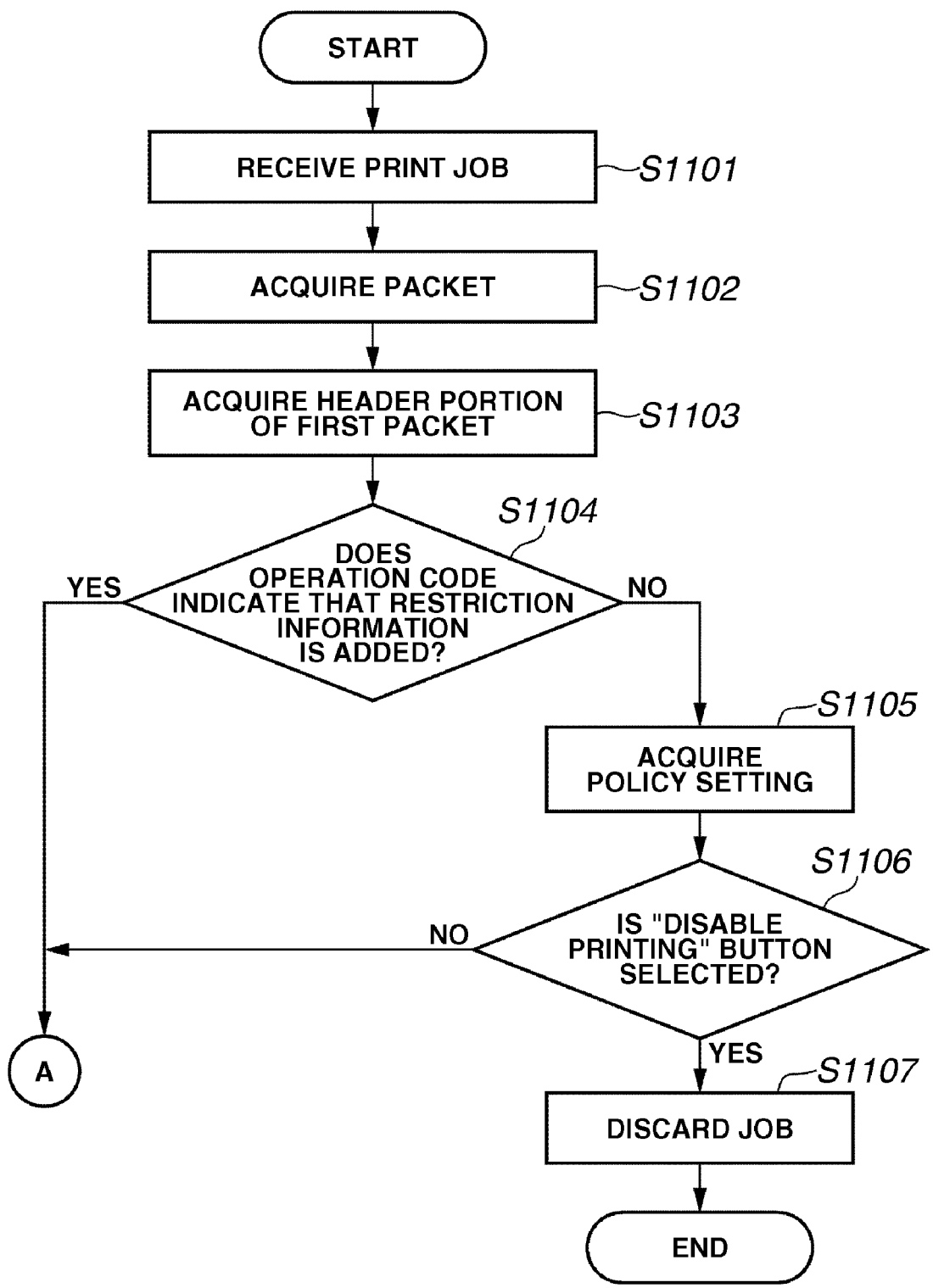
FIG. 23 is a flow chart illustrating processing performed by the image forming apparatus when a print job is received from the host computer according to an exemplary embodiment of the present invention.

Processing for receiving a print job performed by the image forming apparatus 103 is described next. FIG. 23 is a flow chart illustrating one example of processing performed by the image forming apparatus 103 when a print job is received from the host computer 101.

First, in step S1101, the network application 4420 receives a print job. Then, the print job is transferred to the job manager 4040 via the PDL application unit 4023 and the common interface 4030.

In step S1102, the job manager 4040 acquires one job packet existing at a head of the print job. In step S1103, the job manager 4040 acquires an operation code in a header portion of the acquired job packet. In step S1104, the job manager 4040 determines whether the operation code in the header portion indicates restriction information, e.g., operation code is "0x0301". If it is determined in step S1104 that the operation code indicates addition of restriction information (Yes in step S1104), the job manager 4040 shifts the processing to job packet conversion processing (FIG. 24 and so on) which will be described later.

If it is determined in step S1104 that the operation code does not indicate addition of restriction information, e.g., operation code is not "0x0301" (No in step S1104), then the job manager 4040, in step S1105, acquires a setting for the print job to which no restriction information is added. The setting for the print job is made via the policy setting screen 1000 illustrated in FIG. 22.

In step S1106, the job manager 4040 determines whether "disable printing (of a print job to which no restriction information is added)" is selected. If it is determined in step S1106 that "disable printing (of a print job to which no restriction information is added)" is selected (Yes in step S1106), then in step S1107, the job manager 4040 discards the received print job and ends the processing illustrated in FIG. 23. If it is determined in step S1106 that "disable printing (of a print job to which no restriction information is added)" is not selected (No in step S1106), the job manager 4040 shifts the processing to the job packet conversion processing (FIG. 24 and so on).

Figure 24:
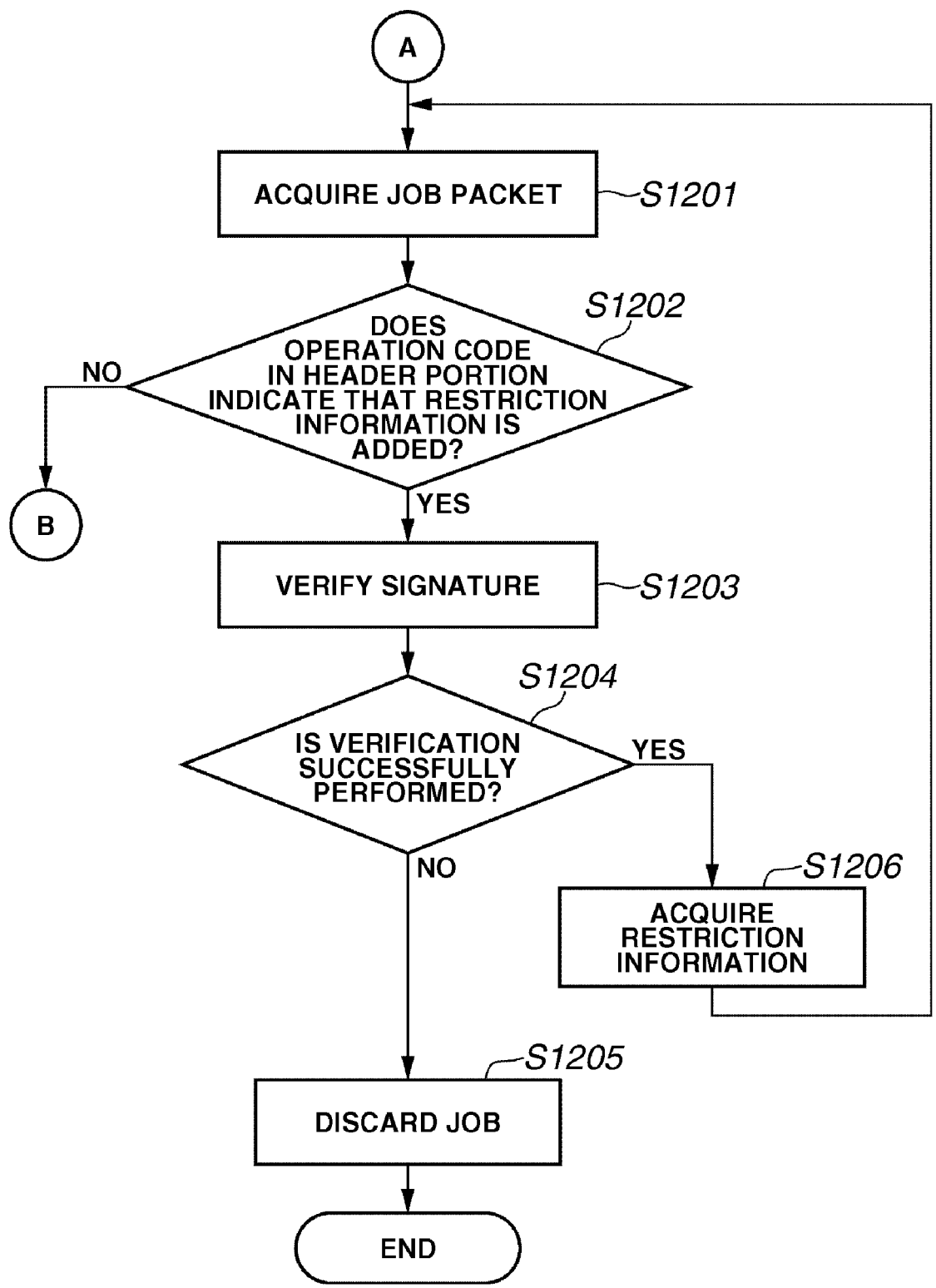
FIG. 24-FIG. 26 is a flowchart illustrating job packet conversion processing according to an exemplary embodiment of the present invention.
Figure 25:
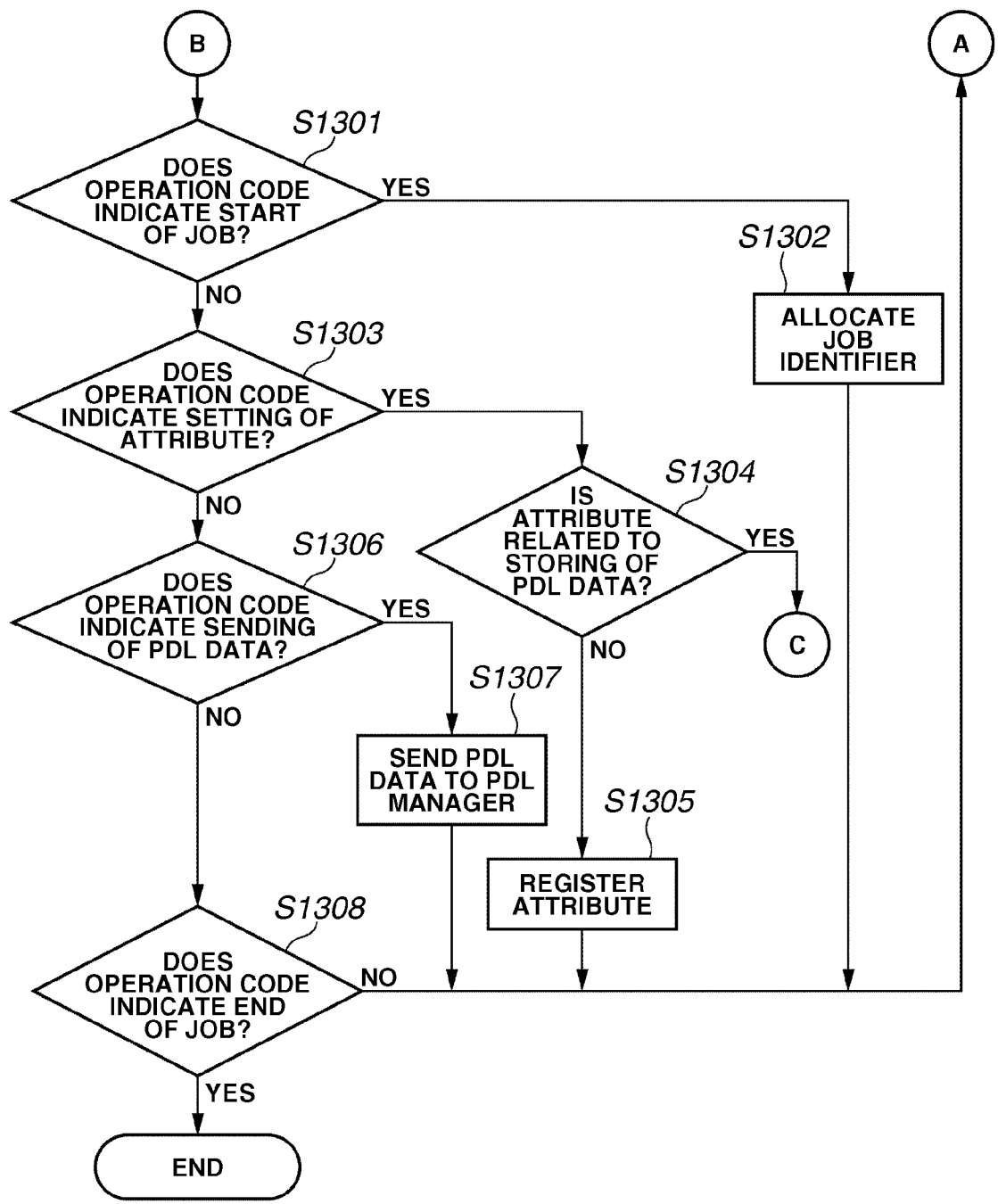
Figure 26:
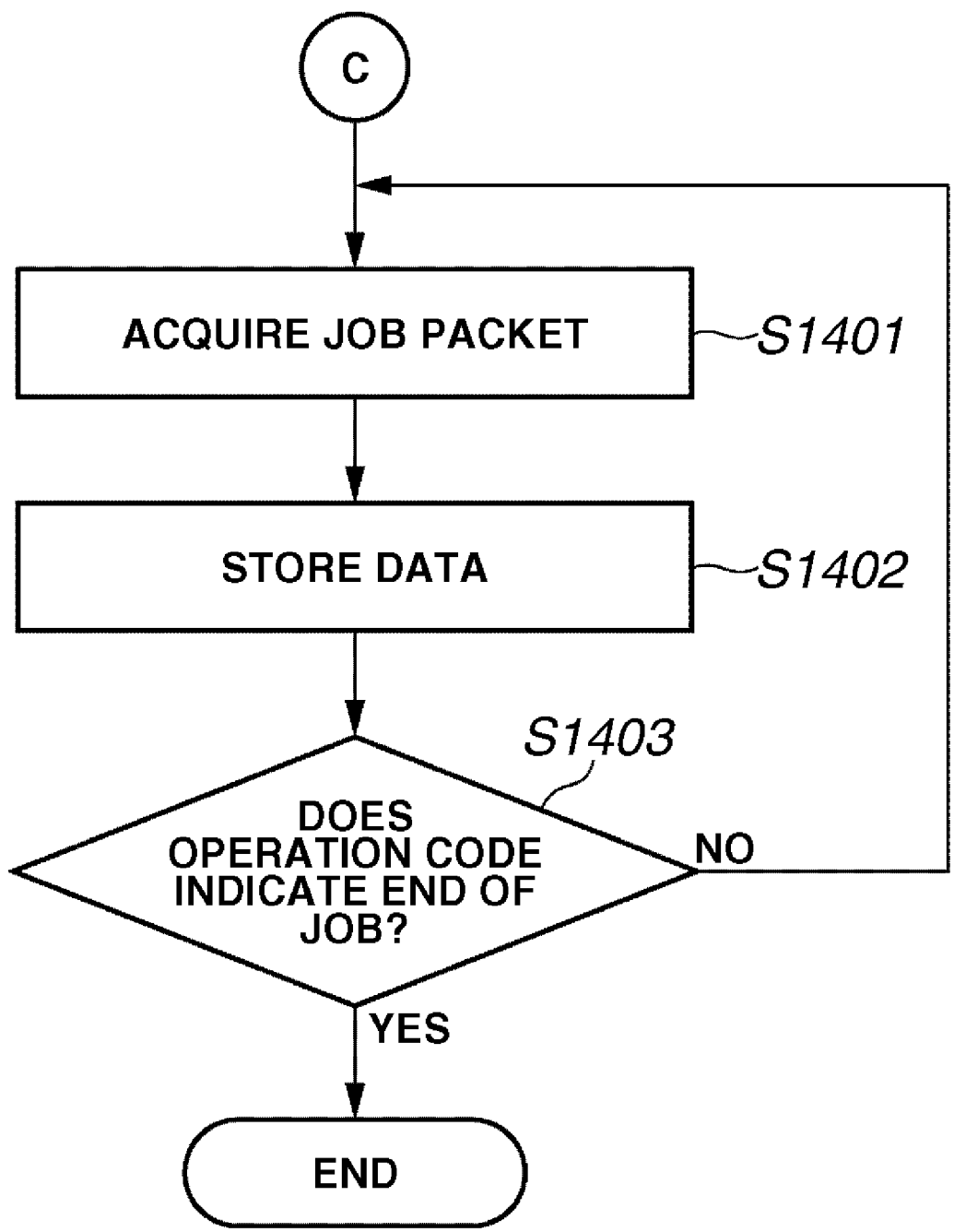

FIG. 24-FIG. 26 is a flow chart illustrating one example of job packet conversion processing.

Referring to FIG. 24, first in step S1201, the job manager 4040 acquires job packets one by one starting from a head of a print job. In step S1202, the job manager 4040 determines whether the operation code in the header portion indicates that restriction information is added, e.g., operation code is "0x0301". If it is determined in step S1202 that the operation code in the header portion indicates that restriction information is added (Yes in step S1202), then in step S1203, the job manager 4040 verifies the digital signature 1202, utilizing a previously acquired public key.

In step S1204, the job manager 4040 determines whether the verification is successfully completed. If it is determined in step S1204 that the verification is successfully completed (Yes in step S1204), then in step S1206, the job manager 4040 acquires restriction information added to the job packet, stores the acquired restriction information onto the memory, and then returns the processing to step S1201. On the other hand, if it is determined in step S1204 that the verification is not successfully completed (No in step S1204), then in step S1205, the job manager 4040 discards all the job packets and ends the processing illustrated in FIG. 24.

If it is determined in step S1202 that the operation code does not indicate addition of restriction information, e.g., operation code is not "0x0301" (No in step S1202), the job manager 4040 shifts to the job packet conversion processing illustrated in FIG. 25.

Referring to FIG. 25, in step S1301, the job manager 4040 verifies operation code for the job packet and determines whether the operation code indicates a start of a job, e.g., operation code is "0x0201". If it is determined in step S1301 that the operation code indicates a start of a job (Yes in step S1301), then in step S1302, an attribute area of the print job is secured and a job identifier is allocated in order to newly produce a job. Then, the job manager 4040 returns to step S1201 again to acquire a job packet.

If it is determined in step S1301 that the operation code does not indicate start of a job (No in step S1301), then in step S1303, the job manager 4040 determines whether the operation code indicates a setting of a job attribute, e.g., operation code is "0x0202". If it is determined in step S1303 that the operation code indicates a setting of a job attribute (Yes in step S1303), then in step S1304, the job manager 4040 determines whether the attribute set by the job packet is an attribute concerning storing of PDL data.

If it is determined in step S1304 that the attribute set by the job packet is an attribute concerning storing of PDL data (Yes in step S1304), the job manager 4040 shifts to the job packet conversion processing illustrated in FIG. 26. The attribute concerning storing of PDL data includes a box number of a box into which the PDL data is stored.

Referring to FIG. 26, in step S1401, the job manager 4040 acquires a next job packet. In step S1402, the job manager 4040 stores a data portion of the acquired job packet into a box having a specified box number. At this time, if the acquired job packet is an attribute setting job packet, the attribute set by the job packet is stored in the box as a print setting of a document. If the acquired job packet is a job packet for sending PDL data, the PDL data is stored in the box as a document. Instead of PDL data, bitmap data obtained by rasterizing PDL data can be stored in a box as a document. In this case, the PDL manager 4070 rasterizes PDL data into bitmap data and the bitmap data is stored in a box. In step S1403, the job manager 4040 determines whether the operation code of the job packet acquired in step S1401 indicates an end of a job, e.g., operation code is "0x0205". If it is determined in step S1403 that the operation code of the job packet acquired in step S1401 indicates an end of a job (Yes in step S1403), the job manager 4040 ends the processing illustrated in FIG. 26. On the other hand, if it is determined in step S1403 that the operation code of the job packet acquired in step S1401 does not indicate an end of a job (No in step S1403), the job manager 4040 returns to step S1401 again to acquire a job packet and repeat the same processing.

The host computer 101, at a head of an attribute setting in the attribute setting job packet 702, specifies an attribute concerning storing of PDL data, and thus the image forming apparatus 103 can store all attributes into a box. The attributes include a setting for retaining a document format. Note that the attribute concerning storing of PDL data can be set in a job packet indicating start of a job.

Turning back to the flow chart illustrated in FIG. 25, if it is determined in step S1304 that the attribute setting is not concerned with storing of PDL data (No in step S1304), then in step S1305, the job manager 4040 stores the content of the attribute set in the job packet into an attribute area produced in step S1302. Then, the job manager 4040 returns the processing to step S1201 to acquire a next job packet.

If it is determined in step S1303 that the operation code does not indicate a setting of a job attribute (No in step S1303), then in step S1306, the job manager 4040 determines whether the operation code indicates sending of PDL data, e.g., operation code is "0x0204".

If it is determined in step S1306 that the operation code indicates sending of PDL data (Yes in step S1306), then in step S1307, the job manager 4040 sends the PDL data to the PDL manager 4070. Then, print processing based on the PDL data is performed. After sending the PDL data to the PDL manager 4070, the job manager 4040 returns to step S1201 to acquire a next job packet and continues to perform the processing.

If it is determined in step S1306 that the operation code does not indicate sending of the PDL data (No in step S1306), then in step S1308, the job manager 4040 determines whether the operation code indicates an end of the job, e.g., operation code is "0x0205". If it is determined in step S1308 that the operation code indicates an end of the job (Yes in step S1308), the job manager 4040 ends the processing illustrated in FIG. 25. On the other hand, if it is determined in step S1308 that the operation code does not indicate an end of the job (No in step S1308), the job manager 4040 returns to step S1201 to acquire a job packet and continues to perform the processing.

Figure 27:
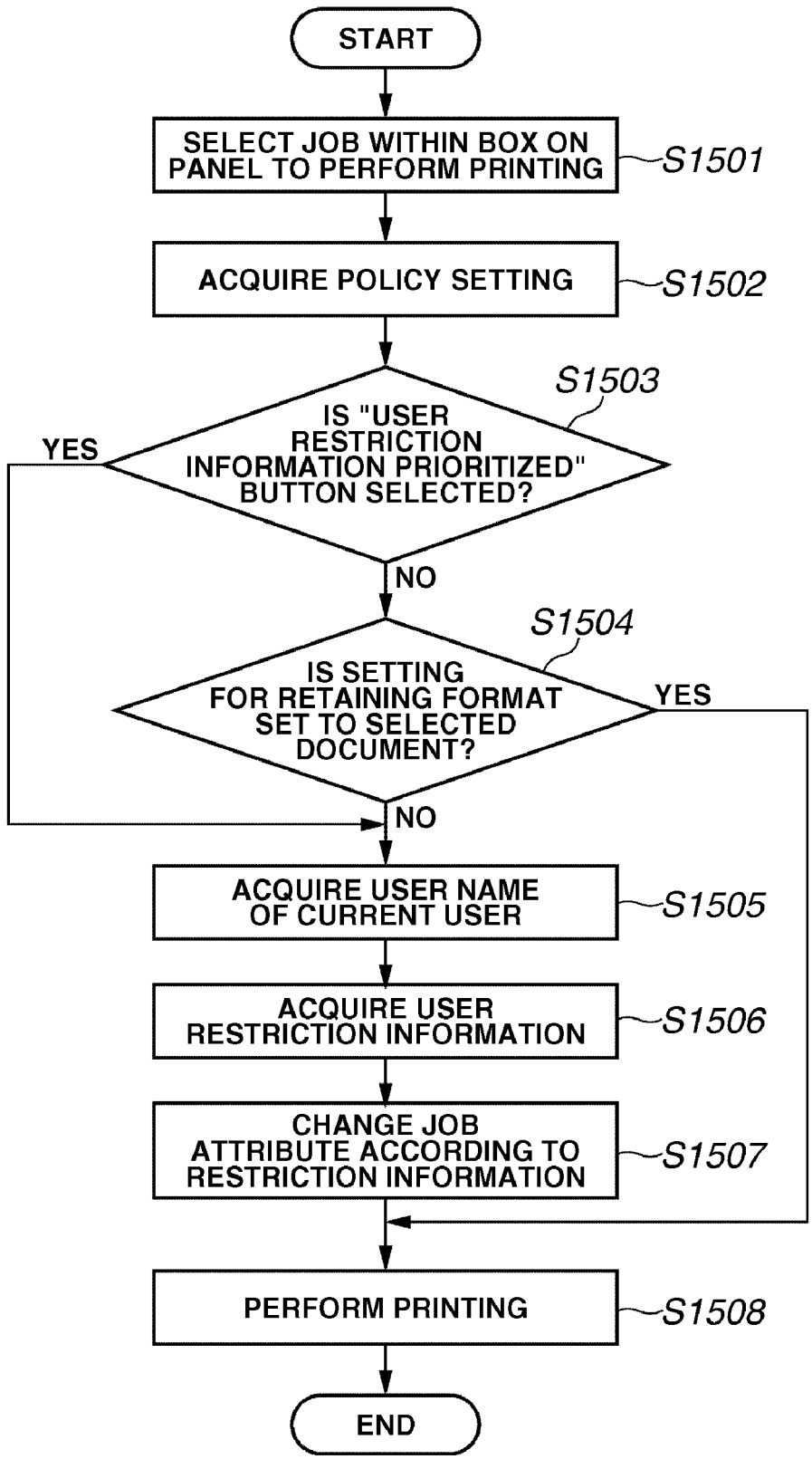
FIG. 27 is a flow chart illustrating processing for printing a document in a box according to an exemplary embodiment of the present invention.

FIG. 27 is a flow chart illustrating one example of processing for printing a document in a box.

Here, a case is described where the user 2 prints a document 2 input into a box of a box number 1 by the user 1 who is permitted to perform color printing. That is, the user 2 selects a document 2 via the box screen in the operation unit 2006 illustrated in FIG. 2, and presses the print button 3507.

FIG. 28 illustrates attribute information indicating attributes of the document 2. FIG. 28 shows that an output paper is set to "A4" sized paper, the setting for color printing is "color", the setting for duplex printing is "off", and the setting for retaining a document format is "on". Note that when the setting for retaining a document format is "on", the print setting for the document cannot be changed.

First, in step S1501, the user 2 selects the document 2 in the box screen in the operation unit 2006 and presses the print button 3507.

In step S1502, the job manager 4040 acquires policy setting information that is set via the policy setting screen illustrated in FIG. 22 and stored in a non-volatile memory such as the HDD 2004. Then, the job manager 4040 refers to the content set in the field 1004 in the policy setting screen, namely, an item prioritized for box printing. After that, in step S1503, the job manager 4040 determines whether "document print setting prioritized" is selected or "user restriction information prioritized" is selected.

If it is determined in step S1503 that "document print setting prioritized" is selected (that is, if it is determined that "user restriction information prioritized" is not selected) (No in step S1503), the job manager 4040 advances the processing to step S1504. In step S1504, the job manager 4040 determines whether the setting for retaining a document format is "on" in the attribute information of the selected document.

If it is determined in step S1504 that the setting for retaining a document format is "on" in the attribute information of the selected document (Yes in step S1504), then in step S1508, the PDL manager 4070 and the synchronization manager 4080 perform printing of the document 2 according to the stored print setting as it is. In the example illustrated in FIG. 28, the document 2 is printed in a color printing mode. Processing performed in printing here is similar to the processing in the case of box printing described above. Accordingly, a description thereof is not repeated here.

If it is determined in step S1504 that the setting for retaining a document format is not "on" in the attribute information of the selected document (No in step S1504), the job manager 4040 advances the processing to step S1505. Likewise, if it is determined in step S1503 that "user restriction information prioritized" is selected (Yes in step S1503), the job manager 4040 advances the processing to step S1505.

In step S1505, the job manager 4040 acquires a name of a current user. In step S1506, the job manager 4040 acquires the restriction information corresponding to the acquired user name (in this case, the "user 2") via the authentication manager 4120. According to the restriction information illustrated in FIG. 2, for the user 2, the color restriction information 203 is only monochromatic printing and no restriction is applied to the user 2 concerning duplex printing.

In step S1507, the job manager 4040 changes the print setting for the document according to the acquired restriction information. Here, although color printing is set for the document 2, the user 2 is restricted to perform only monochromatic printing. Accordingly, the print setting for the document is changed from color printing to monochromatic printing.

After the print setting is changed in step S1507, in step S1508, the PDL manager 4070 and the synchronization manager 4080 perform printing of the document 2. Here, the print setting of the document is changed to monochromatic printing. Accordingly, the document 2 is printed in monochrome. The print processing performed thereafter is similar to the print processing in the case of the above-described box printing. Accordingly, the description thereof is not repeated here.

Other Exemplary Embodiments

Each processing function of the host computer 101, the authentication server 102, and the image forming apparatus 103 in the above-described exemplary embodiments can be implemented by reading a program for implementing each processing function from a memory, and executing the program with a central processing unit (CPU). However, the present invention is not limited to such embodiments. That is, a part of or the whole of each processing function can also be implemented by dedicated hardware. In addition, the memory described above can be configured by a non-volatile memory, a read-only recording medium such as a CD-ROM, a volatile memory, or a computer-readable/writable recording medium constituted by combining the above.

Further, processing can be performed in a manner such that a program implementing each function of the host computer 101, the authentication server 102, and the image forming apparatus 103 is recorded onto a computer-readable recording medium and the program recorded onto the recording medium is read by a computer system to execute the program. Note that the "computer system" referred to here includes an OS and hardware such as a peripheral device.

As described above, according to the exemplary embodiments, a user can select whether printing is performed according to the print setting made to print data (or a print job) or according to restriction information for the user instructing box printing.

According to the present invention, a user can make a selection as to whether printing is performed according to the print setting for the print data which is specified to be unchangeable or according to the restriction information for the user instructing printing of the print data.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-049107 filed Feb. 24, 2006, which is hereby incorporated by reference herein in its entirety.

What is claimed is:

1. An apparatus comprising:

a print data storage unit configured to store print data whose print setting is specified to be unchangeable;

a print unit configured to print the print data stored in the print data storage unit;

an obtaining unit configured to obtain restriction information for restricting print setting available to a user instructing a printing of the print data by the print unit;

a selection unit configured to select whether printing of the print data is performed according to the print setting made for the print data or according to restriction information obtained by the obtaining unit; and a control unit configured to cause the print unit to print the print data according to the print setting in a case where the selection unit selects that the printing of the print data is performed according to the print setting made for the print data, and to cause the print unit to print the print data according to the restriction information in a case where the selection unit selects that the print data is performed according to restriction information obtained by the obtaining unit.

2. The apparatus according to claim 1, further comprising a setting unit configured to set not to print data without obtaining the restriction information by the obtaining unit, wherein in a case where the setting unit sets not to print the print data without obtaining the restriction information by the obtaining unit, the control unit controls to restrict the print unit from printing the print data without obtaining the restriction information by the obtaining unit.

3. The apparatus according to claim 1, wherein the storage unit is able to store the print data and other print data whose print setting is specified to be changeable, and even if the selecting unit selects that the printing of the print data is performed according to the print setting made for the print data, in a case where the other print data is printed by the print unit, the control unit causes the print unit to print the other print data according to the restriction information.

4. The apparatus according to claim 1, further comprising a print setting acquisition unit configured to acquire the print setting made for the print data, from another apparatus capable of communicating with the apparatus via a network.

5. A print processing method in an apparatus comprising a storage unit configured to store print data whose print setting is specified to be unchangeable, the print processing method comprising:

printing the print data;

obtaining restriction information for restricting print setting available to a user instructing printing of the print data;

selecting whether printing of the print data is performed according to the print setting made for the print data or according to obtained restriction information;

printing the print data according to the print setting in a case where it is selected that the printing of the print data is performed according to the print setting made for the print data; and printing the print data according to the restriction information in a case where it is selected that the printing of the print data is performed according to obtained restriction information.

6. The print processing method according to claim 5, further comprising setting not to print the print data without obtaining the restriction information, wherein in a case where it is set not to print the print data without obtaining the restriction information, printing the print data without obtaining the restriction information is restricted.

7. The print processing method according to claim 5, wherein the storage unit is able to store the print data and other print data which print setting is specified to be changeable, and even if it is selected that the printing of the print data is performed according to the print setting made for the print data, in a case where the other print data is printed, the other print data is printed according to the restriction information.

8. The print processing method according to claim 5, further comprising acquiring the print setting made for the print data via a network.

9. A computer-readable storage medium storing a computer program for a print processing method that can be executed in an apparatus configured to store print data whose print setting is specified to be unchangeable, the computer program comprising:

a code to print the print data;

a code to obtain restriction information for restricting print setting available to a user instructing a printing of the print data;

a code to select whether printing of the print data is performed according to the print setting made for the print data or according to obtained restriction information;

a code to print the print data according to the print setting in a case where it is selected that the printing of the print data is performed according to the print setting made for the print data; and a code to print the print data according to the restriction information in a case where it is selected that the printing of the print data is performed according to obtained restriction information.

* * * * *